US012122419B2

(12) United States Patent
Jing et al.

(10) Patent No.: US 12,122,419 B2
(45) Date of Patent: Oct. 22, 2024

(54) TWO-LEVEL PATH PLANNING FOR AUTONOMOUS VEHICLES

(71) Applicant: TUSIMPLE, INC., San Diego, CA (US)

(72) Inventors: Junbo Jing, San Diego, CA (US); Arda Kurt, San Diego, CA (US); Yujia Wu, San Diego, CA (US); Tianqu Shao, San Diego, CA (US); Xing Sun, San Diego, CA (US); Zijie Xuan, San Diego, CA (US); Haoming Sun, San Diego, CA (US); Chasen Sherman, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 480 days.

(21) Appl. No.: 16/912,444

(22) Filed: Jun. 25, 2020

(65) Prior Publication Data

US 2021/0403032 A1    Dec. 30, 2021

(51) Int. Cl.
*B60W 60/00* (2020.01)
*G05D 1/00* (2024.01)
*H04W 4/40* (2018.01)

(52) U.S. Cl.
CPC ....... *B60W 60/0011* (2020.02); *G05D 1/0022* (2013.01); *G05D 1/0274* (2013.01); *H04W 4/40* (2018.02)

(58) Field of Classification Search
CPC .. B60W 60/0011; H04W 4/40; G05D 1/0022; G05D 1/0274; G05D 2201/0213
See application file for complete search history.

(56) References Cited

U.S. PATENT DOCUMENTS

| 9,405,293 | B2 | 8/2016 | Meuleau |
| 10,946,519 | B1* | 3/2021 | Prats ...................... G05B 15/00 |
| 10,948,919 | B2 | 3/2021 | Zhu et al. |
| 2017/0228325 | A1* | 8/2017 | Wilcock ............... G06F 3/0685 |
| 2018/0188040 | A1 | 7/2018 | Chen et al. |
| 2019/0016382 | A1* | 1/2019 | Zarco .................. G05D 1/0212 |
| 2019/0235512 | A1 | 8/2019 | Sinyavskiy et al. |

(Continued)

OTHER PUBLICATIONS

English Translation of JP 2020038631 A Author: Tomioka et al. Title: Information Processing Apparatus, Information Processing Method, Program and System Date: Mar. 12, 2020 (Year: 2020).*

(Continued)

*Primary Examiner* — James J Lee
*Assistant Examiner* — Steven Vu Nguyen
(74) *Attorney, Agent, or Firm* — Perkins Coie LLP

(57) ABSTRACT

Described is a two-level optimal path planning process for autonomous tractor-trailer trucks which incorporates offline planning, online planning, and utilizing online estimation and perception results for adapting a planned path to real-world changes in the driving environment. In one aspect, a method of navigating an autonomous vehicle includes determining, by an online server, a current vehicle state of the autonomous vehicle in a mapped driving area. The method includes receiving, by the online server from an offline path library, a path for the autonomous driving vehicle through the mapped driving area from the current vehicle state to a destination vehicle state, and receiving fixed and moving obstacle information. The method includes adjusting the path to generate an optimized path that avoids the fixed and moving obstacles and ends at a targeted final vehicle state, and navigating the autonomous vehicle based on the optimized path.

17 Claims, 16 Drawing Sheets

(56) References Cited

U.S. PATENT DOCUMENTS

| | | | |
|---|---|---|---|
| 2019/0299984 A1 | 10/2019 | Shalev-Shwartz et al. | |
| 2020/0225669 A1* | 7/2020 | Silva | G06N 20/00 |
| 2020/0363800 A1 | 11/2020 | Jojo-Verge et al. | |
| 2020/0363801 A1* | 11/2020 | He | G05D 1/0088 |
| 2020/0386557 A1 | 12/2020 | Hansson et al. | |
| 2021/0003404 A1 | 1/2021 | Zeng et al. | |
| 2021/0229509 A1* | 7/2021 | Raeis Hosseiny | B60D 1/26 |
| 2021/0294333 A1 | 9/2021 | Jing et al. | |

OTHER PUBLICATIONS

Author: Reza et al. Title: Optimal Control Based Approach for Autonomous Driving Date: Sep. 1, 2016 Publisher: IEEE (Year: 2016).*

U cont: Published in: 2016 IEEE 21st International Conference on Emerging Technologies and Factory Automation (ETFA) (pp. 1-8) (Year: 2016).*

United States Patent & Trademark Office, Notice of Allowance for U.S. Appl. No. 16/826,117, Mailing Date: Dec. 7, 2022, 10 pages.

U.S. Patent & Trademark Office, Non-Final Office Action for U.S. Appl. No. 18/186,137, mailed on Jan. 18, 2024, 19 pages.

Lim, Wonteak, et al., "Hierarchical trajectory planning of an autonomous car based on the integration of a sampling and an optimization method", IEEE Transactions on Intelligent Transportation Systems, vol. 19, No. 2, Feb. 2018.

United States Patent & Trademark Office, Non-Final Office Action for U.S. Appl. No. 16/826,117, Mailing Date: Jan. 10, 2022, 19 pages.

United States Patent & Trademark Office, Non-Final Office Action for U.S. Appl. No. 16/826,117, Mailing Date: Jul. 5, 2022, 19 pages.

* cited by examiner

TWO-LEVEL PATH PLANNING FOR AUTONOMOUS VEHICLES

TECHNICAL FIELD

This document relates to autonomous driving.

BACKGROUND

Autonomous driving vehicles use sensors and processing systems to determine the environment surrounding the autonomous vehicle and to make decisions that ensure the safety of the autonomous vehicle and surrounding vehicles. The sensors should accurately determine distances to, and velocities of, potentially interfering vehicles as well as other movable and immovable objects. New techniques are needed to determine the path an autonomous vehicle should take in environments such as parking lots and narrow roads.

SUMMARY

The disclosed subject matter is related to autonomous driving and in particular to a two-level optimal path planning process for autonomous tractor-trailer trucks which incorporates offline planning, online planning, and utilizing online estimation and perception results for adapting a planned path to real-world changes in the driving environment.

In a first aspect, a method of navigating an autonomous vehicle is disclosed. The method includes determining, by an online server, a current vehicle state of the autonomous vehicle in a mapped driving area. The method includes receiving, by the online server from an offline path library, a path for the autonomous driving vehicle through the mapped driving area from the current vehicle state to a destination vehicle state, and receiving fixed and moving obstacle information. The method includes adjusting the path to generate an optimized path wherein the optimized path avoids the fixed and moving obstacles and ends at a final vehicle state, and navigating the autonomous vehicle based on the optimized path.

The following features can be included in the first aspect and other aspects in various combinations. The current vehicle state includes a current location and a current heading angle, and wherein the destination vehicle state comprises a destination location and a destination heading angle. The adjusting the path includes iteratively adjusting the path. The offline path library is generated by computing resources not co-located with the autonomous vehicle before navigating the autonomous vehicle, and wherein the iteratively adjusting the path comprises evaluating one or more cost functions to determine the optimized path. The one or more cost functions includes a final state error that indicates a closeness between the final vehicle state and the destination vehicle state, wherein the closer the final vehicle state is to the destination vehicle state, the closer the final state error is to an optimum. The offline path library includes a database of possible paths that is computed based on an offline path library generation process. The offline path library is stored in a compressed format at an offline server, wherein the online server performs data expansion for receiving the path. The offline server is located external to the autonomous vehicle and is configured to communicate with the online server via a wireless communication channel when a driving mission is in process or a wired communication channel prior to a start of the driving mission. The path is selected from a plurality of adjusted paths based on a corresponding overall performance metric for each of the plurality of adjusted paths, wherein the path has a best overall performance metric compared to other of the plurality of adjusted paths. The overall performance metric for each of the plurality of adjusted paths comprises one or more of a curvature metric, a curvature change metric, and articulation metric, a distance to lane center metric, a heading angle tracking metric, a body in lane metric, a body extends beyond the mapped permissible area metric, a distance to the object on route metric.

In a second aspect, a method of generating an optimal path for an autonomous driving vehicle id disclosed. The method includes receiving, from a localization system, a current location on a mapped driving area and a current heading angle for the autonomous driving vehicle, and receiving, from a path library generated offline, a path for the autonomous driving vehicle from the current location with the current heading angle to a destination location. The method further includes receiving, from a perception system, object information including location and size information about one or more objects along the path, and adjusting the path received from the path library in response to the object information to cause the autonomous driving vehicle to avoid the one or more objects by taking the adjusted path. The method includes repeating the adjusting the path until a predetermined condition is met, to obtain the optimal path.

The following features can be included in the second aspect and other aspects in various combinations. The repeating the adjusting the path until the predetermined condition is met includes one or more of: determining an overall performance metric value representative of the adjusted path by combining performance metric values for performance metrics along the adjusted path including a steering angle metric, a kinematic metric, and one or more body locations along the adjusted path; and repeating the adjusting the path until the overall performance metric value is no longer improving or running out of computational time budget. The method further includes adjusting the path received from the path library in response to an actual tractor-trailer vehicle mobility change from the norm affected by a fifth-wheel location setting, a trailer vehicle difference, a maximum feasible steering rate, a trajectory tracking accuracy, a driving maneuver optimality, or a safety purpose. The mapped driving area corresponds to a three-dimensional array of grid points overlaid onto a geographic area, comprising location x coordinates, location y coordinates, and heading angle coordinates. The geographic area includes one or more of a parking lot, a narrow street, a cargo hub, or an area where the autonomous vehicle will drive in reverse. The method is performed at the autonomous driving vehicle uses some computational resources not located at the autonomous driving vehicle. The optimal path from a first location to a second location provides collision avoidance, minimizes steering changes, prevents jackknifing, and is smooth.

In a third aspect, a system for determining a travel path for an autonomous vehicle is disclosed. The system includes a data storage device for storing a path library, wherein the path library comprises a plurality of paths each path starting at one of a plurality of starting locations and ending at one of a plurality of endling locations, wherein the plurality of starting locations and the plurality of endling locations correspond to points on a map. The system further includes a first optimal path generator for generating a first optimal path between a selected starting location and a selected ending location, wherein one or more vehicle states affect the first optimal path, and a second optimal path generator for generating a second optimal path based on the first optimal path and one or more obstacles interfering with the first optimal path sensed by a perception system or one or more vehicle parameters that are dynamically determined online.

The following features can be included in the third aspect and other aspects in various combinations. The first optimal path is generated by using static vehicle and map parameters and offline computational resources. The system further includes a vehicle controller for generating at least a steering command, a throttle command, and a brake command to cause the autonomous driving vehicle to follow the second optimal path.

The above and other aspects and features of the disclosed technology are described in greater detail in the drawings, the description and the claims.

DETAILED DESCRIPTION

Figure 1A:
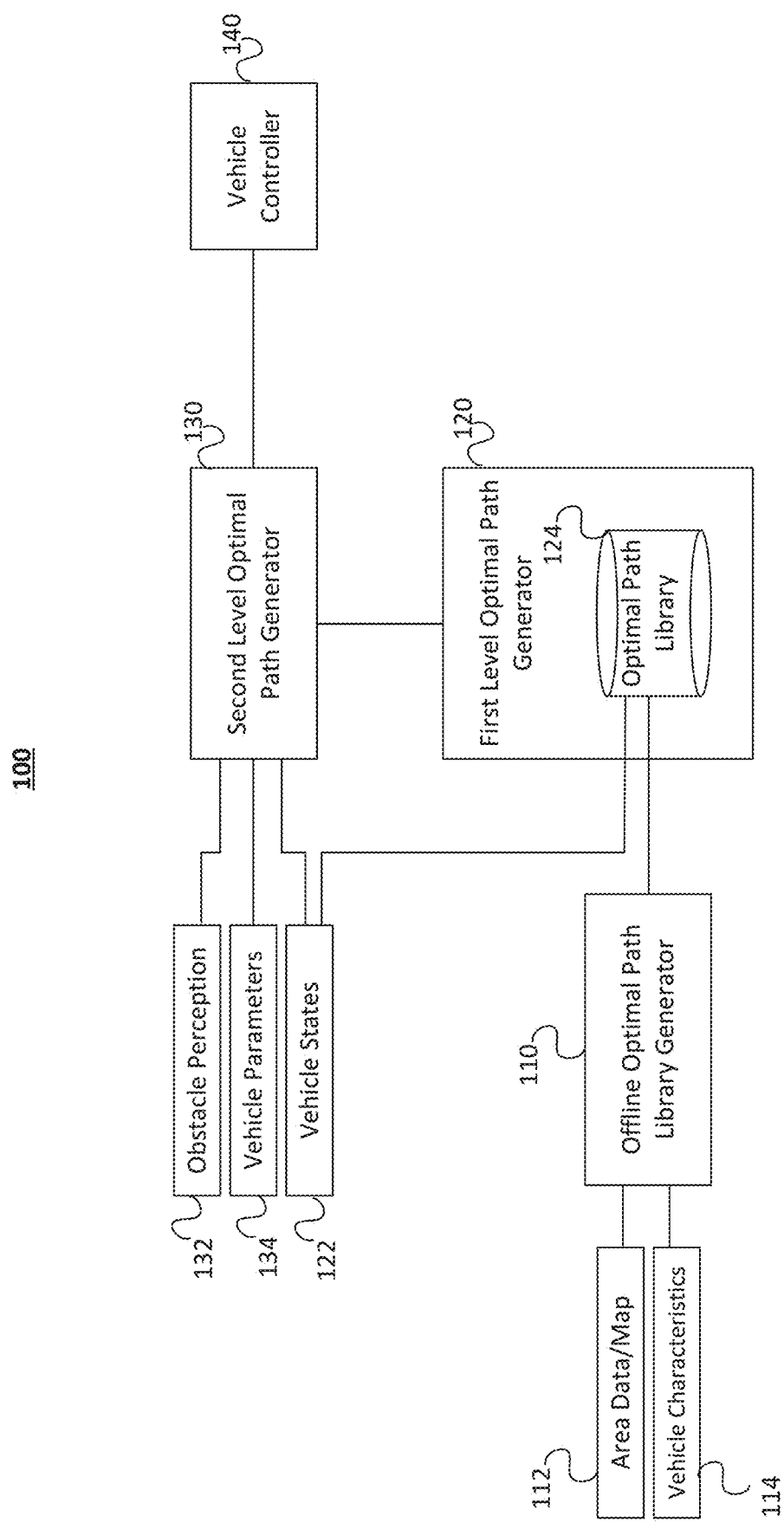
FIG. 1A depicts an example of a two-level system for determining an optimal path for an autonomous vehicle, in accordance with some example embodiments.

Section headings are used in the present document only for ease of understanding and do not limit scope of the embodiments to the section in which they are described.

Disclosed is a two-level path planning technique and apparatus to find an optimal driving path for an autonomous vehicle through a pre-mapped driving space where driving conditions may vary when driven by the autonomous vehicle. Finding an optimal path for a tractor-trailer is challenging due to the size of the vehicle, the large turning radius of tractor-trailers, the steering complexity of an articulated vehicle such as a tractor towing a trailer, various locations around the vehicle that must be checked for collision prevention, special strategies for utilizing road space, and so on. Determining a driving trajectory or path for a vehicle, especially tractor-trailers which require wide turns and especially in parking or docking situations can be computationally expensive for vehicle onboard computers. Driving trajectories can be predetermined for mapped locations and then adjusted as needed based on real-time conditions encountered when driving. The real-time conditions may include driving conditions that differ from a preloaded map or a vehicle configuration that may not be known until encountered while driving, such as road construction, hazards, moving obstacles, trailer differences, and/or driving trajectories generated by offline methods that may not be directly usable for safety concerns.

The disclosed two-level optimal path planning includes a first level offline optimal path library generator and online path reader, and a second level online optimal path planner that starts a path search from the first level results. The first level offline optimal path library generates a compressed optimal collection of paths that is exhaustive in a pre-mapped area such as a parking lot, a narrow street, a cargo hub, etc. for any feasible vehicle state. The online path reader retrieves and expands a driving path based on the vehicle's real time states. See, for example, the section below with heading "Optimal Path Library for Local Path Planning of an Autonomous Vehicle." Results of the first level optimal path library are optimal for the offline average road and vehicle conditions, though may not fit the actual roads or vehicle condition at the time of driving. However, in either case, the first level optimal path library serves as a close initial guess for the second level optimal path online generator's search space. The second level optimal path generator further optimizes the path for the real-time road and vehicle conditions as well as making changes due to traffic and environmental conditions that have changed since the first level optimal paths were determined offline. The disclosed two-level path planning techniques achieve faster computational speed, higher robustness, and better path quality than a single path planner can achieve.

Disclosed is a two-level optimal path planning process for autonomous driving vehicles such as tractor-trailer trucks which incorporate offline planning, online planning for adapting a planned path to changes in the driving environment. As used herein, an offline process is one that is performed using computing resources not located at the autonomous driving vehicle, and an online process is one that can be performed by computing resources at the autonomous driving vehicle. The disclosed techniques include a first level path generator that uses an exhaustive optimal path library that was generated offline, and a second level path generator that uses an online vehicle path planning process that updates the first level optimal path from the library to accommodate changes in the environment or vehicle since the optimal path library was generated. The disclosed techniques include an online estimator for tractor-trailer steering geometry, a perception system that may include sensors and a computer system for detecting and locating potentially interfering objects. The disclosed techniques ensure path planning functionality at the tractor-trailer even when minimal online resources are available by using the offline optimal path library stored at the vehicle as a baseline optimal path which may require no additional processing. When online computing resources are required and available, the baseline first level path from the stored path library may be updated according to environmental and vehicle conditions determined by the perception system. The first level path is optimal for the conditions when the library was generated. The second level path planner refines the first level path based on environmental and truck geometry changes. Environmental conditions may include vehicular traffic that is present, or not present, when the tractor-trailer plans to drive the path, road changes, obstacle changes, and/or weather-related changes such as rain, snow, or ice.

The disclosed optimal path planning techniques use a stored first level optimal path library that contains optimal paths through the driving space, a localization system that provides the vehicle's position/location and orientation (also referred to herein as heading angle), a perception system that identifies objects in the driving space in real time (objects may new to or changed from the mapping used as the basis for the optimal path library), and a tractor-trailer vehicle mobility estimator that takes into account steering geometry changes caused by trailer differences, and a tractor steering rate estimator that takes into account surface friction and vehicle load changes, and a clearance estimator that takes into account ground-clearance and top-clearance of the tractor-trailer.

Upon receiving a request for an optimal path plan, a path planner uses the first and second levels described above. At the first level, the optimal path planner receives the vehicle's location and orientation in the pre-mapped driving space. The optimal path planner reads an initial optimal driving path from the optimal path library. A first level optimal map stores the library of optimal paths in a compressed format that allows for ultra-fast reading of the first level optimal path. The optimal path library was previously computed offline for the road topology and static obstacles in a pre-mapped area. The first level optimal path generated by the optimal path library uses exhaustive offline search results for all possible initial conditions including the location and orientation of the tractor-trailer in the request to generate the first level optimal path. At the second level of optimal path planning, the path planner receives the perception system's identified objects that may or may not exist on the map, and the tractor's fifth-wheel location and the trailer's wheelbase length information from the vehicle geometry estimator. A set of cost functions is evaluated for candidate paths that are changed from the first level optimal path based on the second level planning. The optimal path from the first level planner is used as a starting path modified by the second level planner to result in a faster convergence to a final optimal path. The second level planning may further optimize the first level planning's results for collision avoidance, to minimize steering effort or steering angle, to optimize smoothness, to prevent the possibility of jackknife, and other predefined performance factor optimizations. The final optimal path will guide the vehicle through the space by providing vehicle steering, and longitudinal reference speed inputs.

Compared to other online path planning systems where the path is pre-recorded offline which can result in a path that is far different from the path that the vehicle actually needs to take due to variations of vehicle instantaneous state including vehicle as well as environmental states, the two-level optimal path planning process disclosed here is initialized using a path from an optimal path library based on the vehicle's location and orientation states, that provide a high-quality starting point for the final path that only needs modification due to changes in the environment since the space was mapped and the optimal path library was determined.

Problems with using only earlier pre-recorded offline paths include: 1) the pre-recorded path does not start from the current location and orientation of the vehicle; and 2) the pre-recorded path may not fit because it does not take into account changes due to new or changed objects including traffic. In comparison, the first level optimal path planner disclosed here provides an exhaustive search of the optimal paths starting from any initial state within the mapped range, with customizable optimization criteria that can be aligned in the second level online path planner. The first level optimal path planner provides an initial path that is much closer to the final optimal path than the conventional approach.

Advantages of the initial path from the first level optimal path library include: 1) Faster overall final path planning speed due at least in part the first level exhaustive path library and data compression, and the reading the first level optimal path from the vehicle onboard database which takes only a few milliseconds. The benefit of reading the first level optimal path from the library is a reduction in the total computation time by the number of iterations that do not have to be performed by the second level online path optimization, because the first level path is close to the final second level optimal path. 2) Better robustness in convergence of the path planner. Mathematically, the overall optimization problem can be highly nonlinear and non-convex due to the complexity in the shape of the search space, leading to the possibility of poor local convergence and/or a sub-optimal path. However, the path results in the first level optimal path library are mathematically provable to be globally optimal regardless of problem convexity. With the initial path from the first level optimal path library, the online solver begins a search for the optimal path from a correct region focusing on handling the conditional variance against the norm only. A problem of poor local convergence due to a poor initial guess is much less likely to happen using the disclosed two-level technique.

Another advantage of using an offline first level optimal path library is in functional safety. Since the second level path generator (computed online near the time of driving) uses a nonlinear programming solver which is computationally intense, this second level's success relies on the availability of sufficient and reliable computational resources. If for any reason the vehicle's computational resources are unable to support the online solver's demand, the path from the offline first level optimal path library is still available for navigating the vehicle through the space. The first level path generation adapts to the vehicle location and orientation and reads the first level optimal path from the library requires only light computational resources that will be available at the autonomous vehicle. When insufficient computing resources are available to perform the second level optimal path planning, though functionality including the adaptation to unexpected obstacles and vehicle geometry changes may be sub-optimal or lost, the disclosed system still provides a trajectory that guides the vehicle through the area with the best possibility of success.

The advantages of the disclosed online path planning compared to offline path planning only that does not include an online second level path generation include: 1) The system is capable of handling unexpected road condition changes including new/changed obstacles, road construction, and/or road surface changes since the first level optimal path library was generated; 2) The system optimizes the planned path to the tractor-trailer truck steering geometry where the fifth-wheel and the trailer axle locations are adjusted by the cargo weight and provides precise collision avoidance and steering effort optimization.

Another advantage offered by the disclosed path planning technique is a decoupling of spatial domain and time domain problems. The technique first plans the path in the spatial domain with respect to the static obstacles labeled on the map. The technique then plans in the time domain including the vehicle speed with respect to the moving obstacles identified by the perception system and with respect to lateral dynamic limits of the tractor-trailer due to turning. The decoupling reduces the complexity of the online optimization and thus reduces computation time and memory usage, while maintaining a high-quality path compared with a traditional coupled spatial and time domain planning result. Speed dependency is decoupled from path planning which results in easier and cleaner problems to solve. Decoupling reduces computational complexity from an $o((M+N)^2)$ to an $o(M^2)+o(N^2)$ problem. Decoupling also transforms part of the computational load from online to offline in this design. Decoupling produces the same result as directly planning with speed until a vehicle tire slides. Furthermore, the decoupled planning is easier to interpret by the developer in understanding the solver's decision, which improves the ease of algorithm maintenance.

FIG. 1A depicts a two-level path planning system 100, in accordance with some example embodiments. Offline optimal path library generator 110 generates an optimal path library based on a map of a particular area such as a parking lot including data points taken in a grid pattern in the area. The data points may include data representative of the area such as dimensions, slopes, obstacles, designated travel areas or lanes, designated parking areas, discontinuities in the surface, and so on. The data may be captured by sensors such as cameras, LIDAR sensors, ultrasonic sensors, and so on. The offline optimal path library 110 uses as inputs map/data 112, and vehicle characteristics 114 which may include information such as turning radius, vehicle height, ground clearance, trailer dimensions, and so on.

A first level optimal path generator 120 reads an optimal path from the optimal path library 124 with inputs including a desired ending location and vehicle states 122 including location and orientation of the tractor and trailer.

A second level optimal path generator 130 starts with the first level optimal path and updates or changes the first level optimal path based on detection by the perception system 132 of additional or changed obstacles related to the first level path and/or additional vehicle parameters 134 such as parameters related to hitch or trailer rear wheel adjustments due to the load being carried by the trailer, maximum tractor front wheel steering rate change due to load or surface friction change, and the vehicle states 122. In addition to the spatial path, the second level optimal path generator also determines the timing of various vehicle inputs such as steering inputs, and reference vehicle longitudinal speed, to cause the tractor-trailer to follow the path.

At 140, the second level optimal path results are provided to the dedicated vehicle dynamic controller 140 which causes steering, throttle, and braking to occur. The optimal path generator can take the camera-detected vehicle obstacles/constructions as constraints and adjust the first-level optimal path based on the tractor-trailer geometry. The generated optimal path can guarantee reaching the desired state without collision. The computation requires onboard computational devices and may be computationally difficult because a nonlinear solver may be required to solve the path generation problem.

The second level path planner approximates identified objects using combinations of convex sets to formulate state constraints for the path optimization solver. These constraints are used to regulate future projections of the tractor-trailer vehicle body locations, by a given sequence of tractor vehicle steering inputs, which are the variables being optimized by a nonlinear programming optimization solver. A set of performance criteria are assigned to the sequence of tractor vehicle steering inputs and the projections of tractor-trailer vehicle future body states, and the weighted combination is used as the cost function of the online optimization problem. The optimization solver iterates through variations of the tractor vehicle steering input sequence based on the total performance cost change. The better the initial guess of the steering input sequence is, the less computation time is required to perform the iterations, and the less likely the solver is to terminate at a bad local minimum of total performance cost.

Figure 1B:
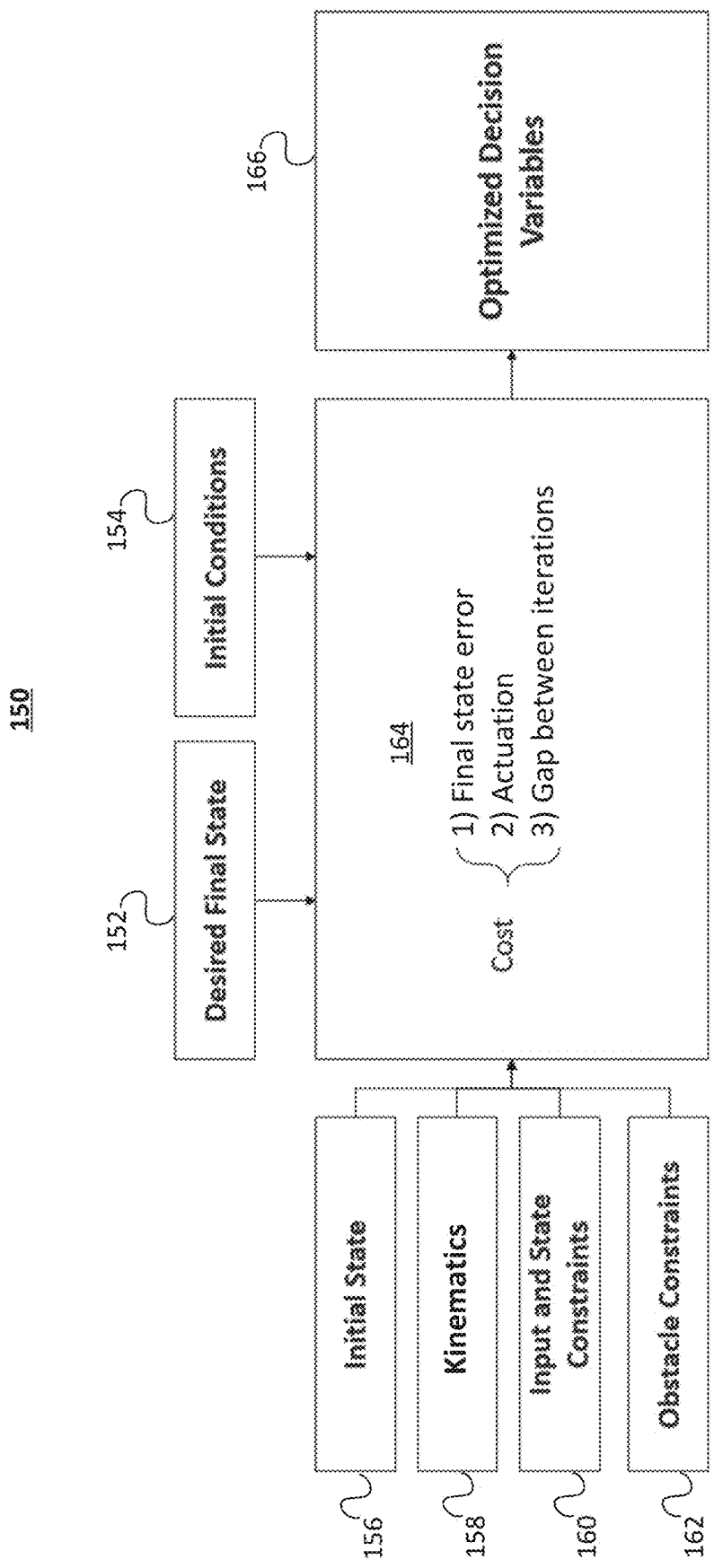
FIG. 1B depicts an example of the inputs to, and outputs from, a nonlinear optimization process for determining a second level path, in accordance with some example embodiments.

FIG. 1B depicts an example of the inputs to, and outputs from, a nonlinear optimization process for determining a second level path, in accordance with some example embodiments. Inputs include desired final state 152 which may include a final state for the vehicle including, for example, vehicle location, orientation of the tractor and trailer, etc., initial state 156, initial conditions 154, kinematics 158 including, for example, a model for determining vehicle response to inputs, input and state constraints 160, and obstacle constraints 162. The nonlinear optimizer produces iterations of solutions that are evaluated in terms of cost 164. Cost 164 may include an evaluation of an error cost between successive iterations. A cost may be generated for each iteration based on a comparison of the state after the iteration to the desired final state to generate a final state error. Another cost may be generated based on a gap or difference between successive iterations. The costs may be determined from evaluation of spatial sequences of decision variables defined by tractor vehicle position coordinates, tractor vehicle heading angle (orientation), tractor-trailer articulation angle, and dual penalty variables for distance to collision with each of the identified obstacles.

Figure 2:
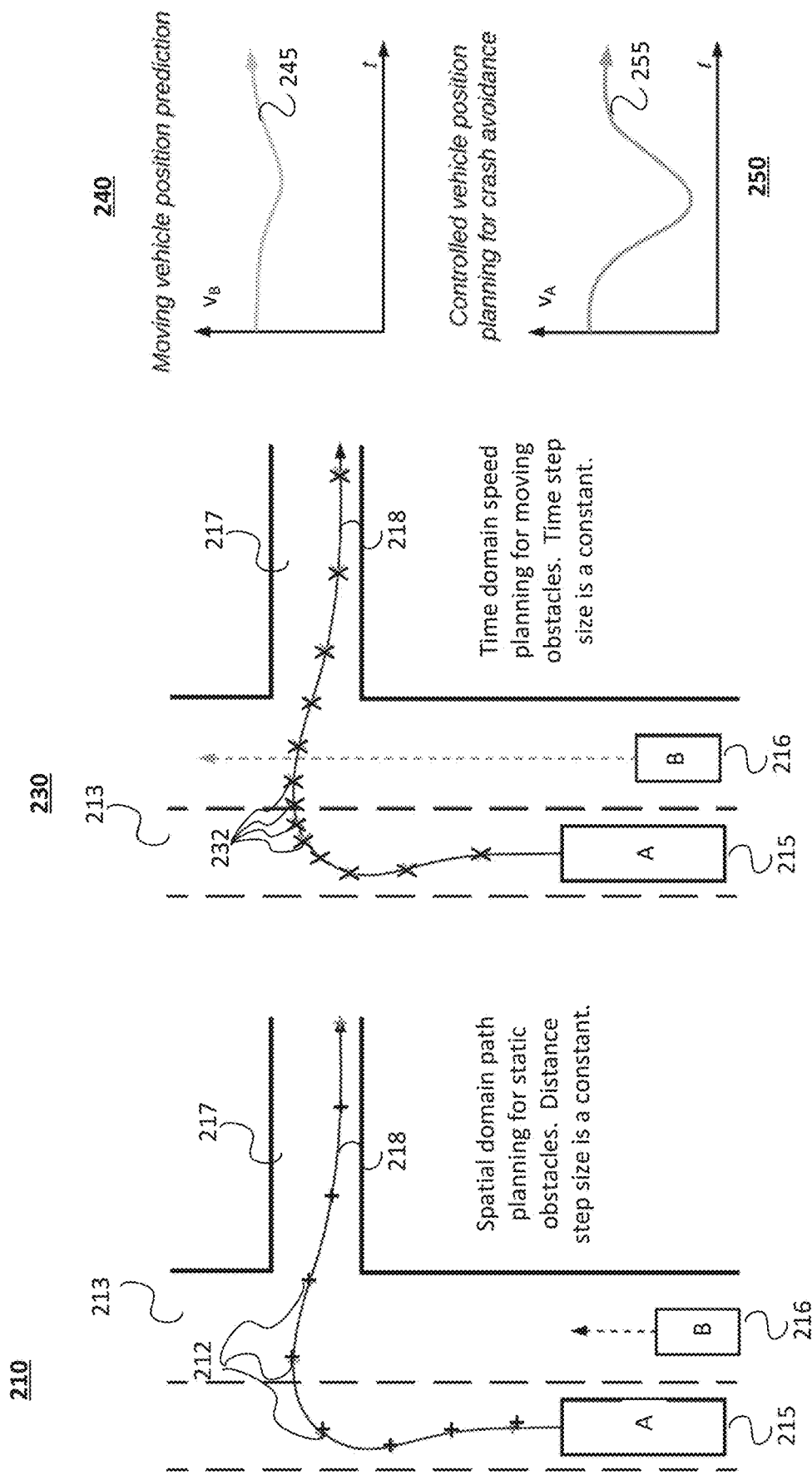
FIG. 2 depicts an illustration showing decoupled spatial domain planning and time domain planning, in accordance with some example embodiments.

FIG. 2 depicts an illustration showing decoupled spatial domain planning and time domain planning, in accordance with some example embodiments. Shown at 210 is an example of spatial path planning for path 218 along the specific road scenario of a tractor-trailer turning right from a multi-lane road 213 to a narrow single lane road 217. For spatial planning with respect to static obstacles, a fixed distance step size is used. That is, the distance between each planned point 212 along path 218 is equal to the distance between the other points 212. In this way, vehicle longitudinal speed is removed from the decision variables at each step element when searching.

Shown at 230 is an example of time domain speed planning for path 218 along the specific road scenario of a tractor-trailer turning right from a multi-lane road 213 to a narrow single lane road 217. For time domain planning with respect to moving obstacles, a fixed time step size is used. That is, the time between each planned point 232 along path 218 is equal to the time between the other points 232. In this procedure, one dimension of the decision variable is vehicle longitudinal speed along a fixed vehicle path determined from the prior stage of spatial domain planning.

As detailed above, the path planning problem is separated into a spatial domain problem and time domain problem.

Shown at 240 is an example of a graph showing a predicted velocity 245 of vehicle 216 that is interfering with autonomous tractor-trailer 215 as a function of time. The graph corresponds to the predicted velocity as vehicle 216 approaches the intersection of roads 213 and 217. The autonomous driving system performs the prediction of the velocity of vehicle 216 as shown. The prediction shows that vehicle 216 will likely slow down a little as it approaches the intersection and then speed-up to around its original speed. The graph shown at 240 is an illustrative example, other levels of speed change may be predicted for different traffic and road environments.

Shown at 250 is an example of a graph showing the planned velocity 255 of autonomous vehicle 215 that has interfering vehicle 216 in the adjacent lane. Autonomous vehicle 215 must perform collision avoidance to prevent a crash. The graph corresponds to the planned velocity for autonomous vehicle 216 as it approaches, prepares for, and executes a turn from road 213 to road 217. The autonomous driving system determines the planned velocity which may require computation in the time domain planning, shown at 255 to avoid a collision with vehicle 216. Autonomous vehicle 215 will slow down significantly more as it approaches the intersection as shown at 255 and then speed-up to around its original speed after it makes the turn. The graph shown at 250 is an illustrative example, other levels of speed change may be planned for different traffic and road environments.

Figure 3:
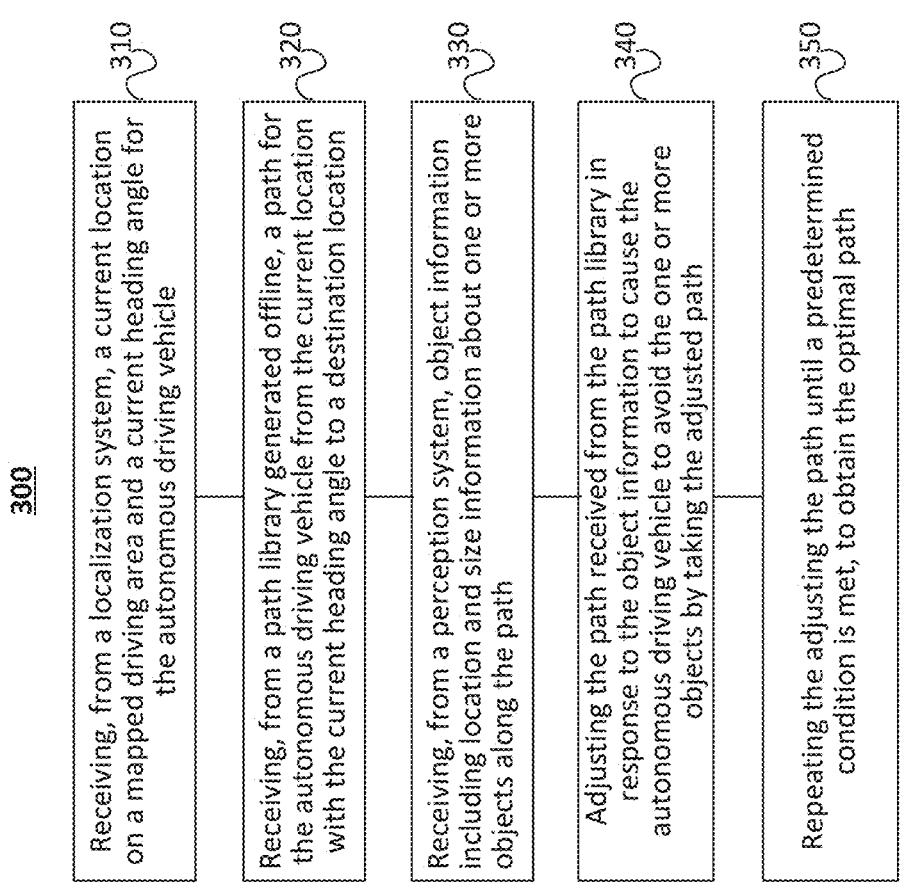
FIG. 3 depicts an example of a process, in accordance with some embodiments.

FIG. 3 depicts a process, in accordance with some example embodiments. At 310, the process includes receiving, from a localization system, a current location and a current orientation for the autonomous driving vehicle. At 320, the process includes receiving, from a path library, a path for the autonomous driving vehicle from the current location to a destination location. At 330, the process includes receiving, from a perception system, object information including location and size information about one or more objects along the path. At 340, the process includes adjusting the path received from the path library in response to the object information to cause the autonomous driving vehicle to avoid the one or more objects by taking the adjusted path. At 350, the process includes repeating the adjusting the path until a predetermined condition is met, to obtain the optimal path.

Optimal Path Library for Local Path Planning of an Autonomous Vehicle

Detailed below is the offline first level optimal path library generator. The first level optimal path library generator includes path planning for a tractor-trailer in a restricted geographical space. In a first part, an offline process is used for generating a compact library of optimal driving paths for a pre-mapped driving area that can be stored at the autonomous vehicle. In a second part, the optimal path library can be read online to generate vehicle driving path trajectories specific for vehicle locations and orientations that are updated in real time.

In some example embodiments, the disclosed subject matter may be used for navigating a tractor-trailer vehicle through a geographical space that is challenging to maneuver the vehicle given the vehicle's size and geometry. For example, challenging spaces include a narrow street, a parking area, a docking area, a sharp intersection, and so on. Some scenarios are also referred to as "local wide turns" for a tractor-trailer truck.

Path planning in the scenarios described above for tractor-trailers is challenging because a tractor-trailer is articulated which makes path planning exhibit a high order and a high nonlinearity. The complicated shape of realistic city driving makes the search space highly non-convex. The disclosed subject matter transfers the optimization search problem from the autonomous vehicle to an offline server that provides compact search results to the vehicle's online computer. A global optimal exhaustive search is possible due to the use of offline computing resources that may be significantly more powerful and may work on a larger time budget than the available online computing resources.

Some embodiments use a solution that discretizes a driving or position space into a grid node map defined by lateral and longitudinal location nodes along a reference driving line on a driving map. The solution further discretizes the orientation space of each grid node into a grid bin array that defines the heading angle resolution of a driving trajectory. A grid node defines one deterministic location coordinate set before the search starts, and a grid bin defines a memory space for a range of orientation angles of which a specific value will be determined dynamically while the search proceeds. The location grid node map and orientation grid bin map together may be referred to as a state space grid map. Each state vector is defined by three elements of vehicle location including a vehicle x-coordinate value, a vehicle location y-coordinate value, and a vehicle heading angle value.

Some embodiments perform an exhaustive search offline for an optimal vehicle driving trajectory for the predefined and discretized driving space. The search includes all feasible sets of vehicle location and orientation combinations in the state space grid map. The search is performed offline from the autonomous vehicle, and every possible driving state situation in the discretized state space can be pre-evaluated in preparation for an autonomous driving path. Computation memory management uses Bellman's optimality principle by performing the search in a backward direction from the desired terminal state (location and orientation) and only keeps the cumulative optimal solution. As such, the total memory usage is finite and reasonable in scale. The desired terminal state defines one margin of the searchable space of the map area.

The search process evaluates the driving trajectory connections between every two pairs of state space grid nodes on two layers along the reference driving direction of the map space to determine the best driving step action leading to global optimal complete trajectories. The evaluation starts by constructing a trajectory arc between the two grid nodes following the vehicle kinematic model, tracing from the trajectory heading angle of the optimal trace stored in the lower layer grid node's evaluated grid bin. Trajectory heading angle values stored in the upper layer grid nodes' grid bins are determined dynamically as the search proceeds. Action and state costs related to vehicle kinematics can be assigned to evaluate the motion smoothness and reference driving trajectory tracking accuracy performance.

Search evaluation at each step further proceeds by expanding the vehicle kinematic trace defined by a bicycle model between every two feasible grid nodes into traces specific to tractor-trailer vehicles that factors in trailer motion states, and into traces of vehicle body corners and vehicle tires that may relate to motion control when driving in a confined space. Action and state costs related to vehicle detailed position information can be assigned to evaluate driving space usage and collision avoidance performance.

After costs are assigned for all of the trajectory connections to a layer of grid nodes, the method keeps only the optimal trajectory connections to every reachable pair of grid node and grid bin and deactivates the pairs of grid nodes and grid bins for the next layer's search evaluation if certain criteria are violated. The optimal trajectory connections' linkage information in regard to the related two layers of grid nodes is then saved to formulate the optimal path library.

The search process may repeat the foregoing evaluating the driving trajectory connections, the expanding the vehicle kinematic trace, and the keeping only the optimal trajectory connections to every reachable pair of grid nodes for each unevaluated layer of grid nodes, until reaching the other margin of the interested area on the map which corresponds to the foregoing margin of the searchable space of the map area.

When using the optimal path library online, as the autonomous vehicle approaches a mapped turn area, the method uses the vehicle's current x and y coordinates reported from a localization method to find the nearest grid node on the discretized state space of the optimal path library, and then uses the vehicle's current heading angle value reported from a yaw angle measurement device to find the nearest orientation grid bin of the nearest location grid node. The optimal trajectory linkage information can then be retrieved and expanded autonomously.

The optimal trajectory linkage information indicates the optimal connection grid node and grid bin of the next layer, and the path compact analytical solution in between the connection defined by vehicle kinematics, to reconstruct the continuous vehicle driving trajectory in physical space.

As each pair of grid node and grid bin is assigned with the optimal trajectory linkage information to the next layer, the entire optimal driving trajectory expands consecutively and autonomously starting from the initial pair indicating the vehicle's current location and orientation, leading to the desired terminal driving state on the map of the turning area represented by end pair of grid node and grid bin.

The foregoing finding the nearest orientation grid bin of the nearest location grid node, the linkage between the layers and physical path expansion, and the expansion of the entire trajectory is ultra-fast and computationally light, as the node optimal connection information has been predefined offline, and the online process only needs to retrieve such information link by link. No recursive computation is involved to fully expand the trajectory, and therefore the computation time and memory usage can be accurately expected in advance.

As the vehicle drives forward, the process includes finding the nearest orientation grid bin of the nearest location grid node, the linkage between the layers and physical path expansion, and the expansion of the entire trajectory is constantly repeated. An optimal driving trajectory is constantly updated to accommodate the trajectory tracking error that happens in the real world. The process formulates a closed-loop feedback for the vehicle's real-time trajectory tracking driving state, which enhances the system robustness against disturbances and system performance imperfections.

Disclosed are techniques for generating a compact library of optimal paths that can be stored at an autonomous vehicle and taken from one location to another. For example, the compact library may include optimal paths through a parking lot for an autonomous tractor-trailer vehicle that takes into account the wide turns taken by a tractor-trailer. The paths are optimal in that the paths provide avoidance of collision with fixed objects, the paths minimize steering changes, prevent jackknifing of the tractor-trailer, and ensures that the paths taken are smooth. The paths are optimal in balancing passenger comfort and vehicle steering effort, while following the traffic rules presented by lane semantic tags. The library is read online to obtain an optimal path from the vehicle's instantaneous state by using the autonomous vehicle's onboard computing resource, but the library of optimal paths may be generated offline using other computing resources and not using the autonomous vehicle's computing resources.

A given map may correspond to a selected area such as a parking lot, narrow street, or other fixed area. On the given map, the offboard computer performs an optimal driving trajectory search within a search space, generates a candidate trajectory, and evaluates the candidate trajectory. The disclosed techniques use an exhaustive search and data compression algorithm to process a 2D map space into a collection of all possible optimal driving trajectories in the map space, and to compress all possible driving trajectories into a compact optimal path library that is small enough to store in the autonomous vehicle's onboard memory. The optimal path library is offline in that it does not use computational resources at the vehicle and does not rely on communication to another system such as a server that is away from the vehicle. The system may include a localization system for providing real-time vehicle location used in reading the online the optimal path library. The system may also include memory space for storing the optimal path library, and a computer that includes a database reader to expand the compact representation of the paths into an actual path using a digital key. The disclosed techniques transfer a complicated tractor-trailer vehicle path planning task from being online to offline.

The disclosed techniques may be used by an autonomous driving system on a tractor-trailer truck to generate an optimal driving path through a pre-mapped space using a pre-generated offline optimal path library. The space may include areas that are challenging for turning a tractor-trailer, such as areas with tight turns, parking lots, docking areas, narrow streets, and so on.

As an illustrative example, the autonomous vehicle may be travelling from one location to another distant location. The starting location may be a parking lot that has been pre-mapped. The autonomous driving system may request from the path library system a driving path through the parking lot. The request may include the vehicle location and orientation information so that an optimal path will take into account the orientations and locations of the tractor and the trailer. In response to the request, an optimal driving path is read from the pre-generated and compressed optimal path library stored on the autonomous vehicle, and then expanded into a high-fidelity path data in the mapped physical space with minimal computation. The expansion process is further described below and uses a digital key. The generated driving path from the map's optimal path library will guide the vehicle along the path and include collision avoidance for fixed objects, minimal steering effort, optimized smoothness, jackknife prevention, and other predefined performance factor optimizations. Path planning for a tractor-trailer that must drive in reverse is difficult due to the unstable nature of a tractor-trailer driving in reverse and the tendency to jackknife. The disclosed subject matter prevents jackknifing due to the offline exhaustive search.

The disclosed techniques offer advantages including transferring the autonomous vehicle path planning, which is computationally expensive for tractor-trailer vehicle geometry, from an online computation taxing the vehicle's onboard computers into an offline computation where significantly larger computational resources are available, and more time is available. This reduces hardware cost for the computers onboard the autonomous vehicle. Offline path generation also improves the flexibility of a path planning cost function by allowing mathematical complexity. The conventional approach using online path planning must perform extensive approximations for collision avoidance to maintain solvable mathematical complexity. The disclosed techniques allow collision avoidance optimization that includes accurate vehicle location, and balances between passengers' psychological comfort (closeness to objects), lane semantic tags, traffic rules, operational practice, etc. with fewer computational resources required on the autonomous vehicle. The disclosed offline path library generation method is improved over the conventional approach due in part to the disclosed technique's exhaustive search through the technique of reverse direction search.

Figure 4:
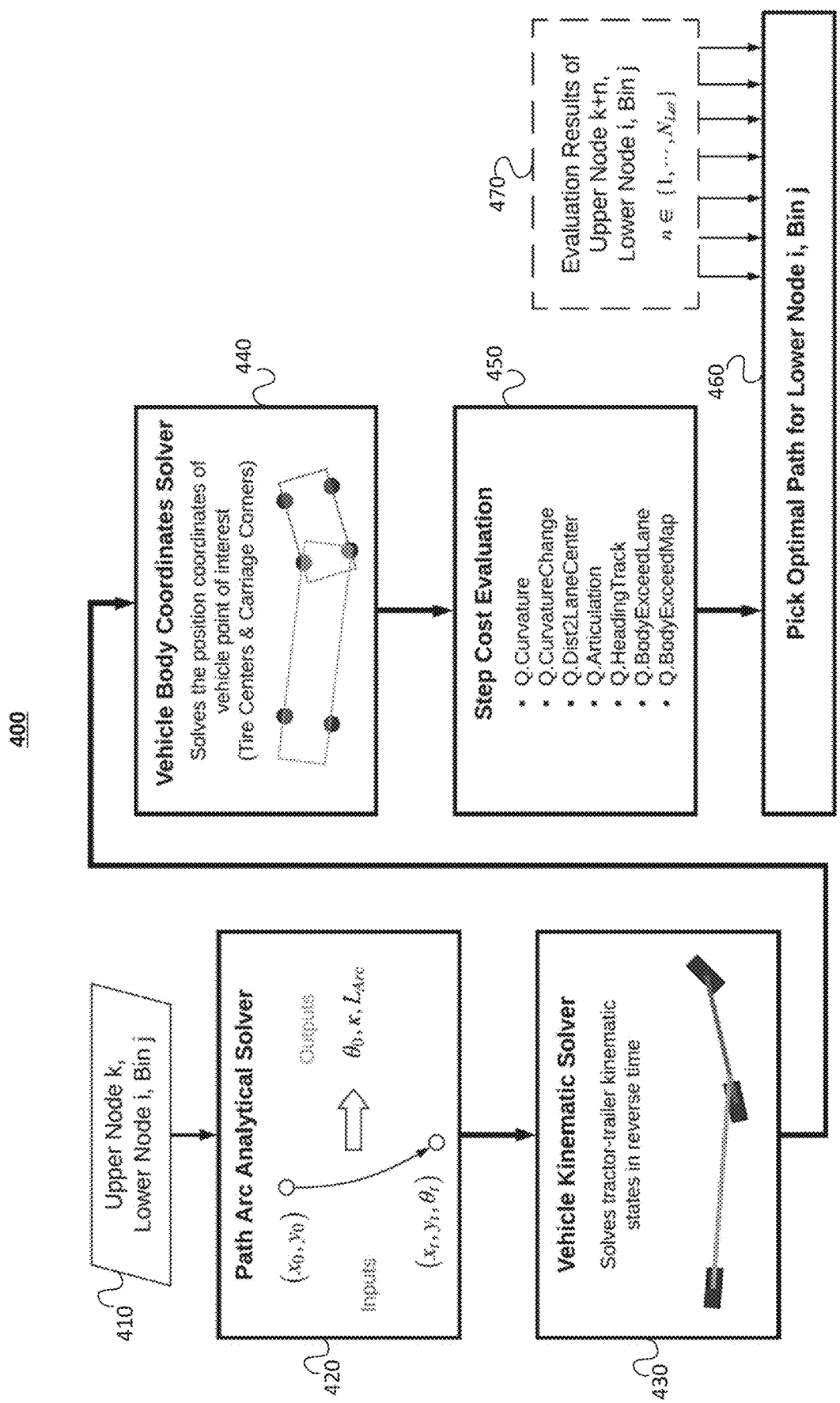
FIG. 4 depicts an example of a process for offline path search and evaluation, in accordance with some example embodiments.

FIG. 4 depicts a process 400, in accordance with some example embodiments. The process generates an optimal path for a vehicle through a mapped area by evaluating all feasible path connections. The optimal path generation process may start at the desired ending location for the vehicle and end at the starting location for the vehicle. By exhaustively searching for a path from the ending location to the starting location, the search will result in globally optimal paths for any initial states within the search space.

At 410, the mapping process is provided with a lower layer position grid node denoted by i and a heading angle grid bin denoted by j, and an upper layer position grid node denoted by k. The upper layer position grid node corresponds to a later node along the optimal path in the search direction or a direction corresponding to an earlier node in time, and the lower layer position grid node corresponds to an earlier node along the optimal path in the search direction or a direction corresponding to a later node in time. Associated with each node such as nodes i and k are parameter values including parameters describing the vehicle location and position including x coordinates, y coordinates, heading angles, articulation angles, steering angles, step action costs, step accumulative costs, and linkage information to neighboring layer nodes, which identify the index range of reachable nodes and the node index of an optimal connection leading to the desired terminal state.

At 420, an arc solver determines a continuous arc path of constant curvature from location $(x_0, y_0)$ to a point $(x_t, y_t, \theta_t)$ that will be travelled by the vehicle after $(x_0, y_0)$. $\theta_t$ is representative of the orientation of the tractor at the terminal point of a path arc, which is the heading angle when the path arc reaches to the lower layer position grid node. The arc solver determines parameter values of the tractor driving arc path that would cause the tractor-trailer to move from $(x_0, y_0)$ to a point $(x_t, y_t, \theta_t)$, which includes the arc curvature $\kappa$, arc length $L_{Arc}$, and the tractor vehicle's initial heading angle $\theta_0$.

At 430, a kinematic solver solves for the tractor-trailer kinematic states along the arc path in reverse time, which includes the continuous traces of tractor heading angle, tractor rear axle center location, tractor steering angle, trailer heading angle, trailer rear axle center location, and trailer articulation angle.

At 440, a vehicle body coordinates solver determines the positions of selected points of the tractor-trailer along the arc path. For example, the selected points on the tractor-trailer may include wheel locations of the tractor and the trailer, carriage body corners for collision avoidance with fixed objects, locations of the high points of the tractor trailer for verifying height clearance with fixed objects, and low points of the tractor trailer for verifying ground clearance with fixed objects.

At 450, one or more cost or performance metrics are applied to the arc path. The metrics may include a curvature metric, a curvature change metric, an articulation angle metric for jackknife prevention, a distance to lane center metric, a heading angle tracking metric, a body in lane metric, and/or a body in the mapped permissible area metric. The following describes an example of how values for the above-noted metrics may be affected by driving a tractor-trailer along the arc. For example, the curvature metric may generate a higher (or lower) value indicating a more desirable path for an arc path that has a larger radius of curvature compared to an arc path with a smaller radius of curvature. In another example, the curvature change metric, may generate a higher (or lower) value indicating a more desirable path for an arc path that has a smaller rate of change of a turning radius of curvature compared to an arc path with a larger rate of change of the radius of curvature. In another example, the articulation metric may generate a higher (or lower) value indicating a more desirable path for an arc path that where a maximum angle between the tractor and the trailer is smaller (closer to straight line alignment between the tractor and the trailer) compared to an arc path where a maximum angle between the tractor and the trailer is larger, especially when the angle is close to an angle that may cause a jackknife. In another example, the distance to lane center metric may generate a higher (or lower) value indicating a more desirable path for an arc path that stays close to the driving lane center line. In another example, the heading angle tracking metric may generate a higher (or lower) value indicating a more desirable path for an arc path on which the vehicle's driving heading angle stays close to the driving lane center's heading angle. In another example, the body in lane metric may generate a higher (or lower) value indicating a more desirable path for an arc path through which the vehicle's bodies stay within the lane area as much as possible while driving. In another example, the body in the mapped permissible area metric may generate a higher (or lower) value indicating a more desirable path for an arc path that makes the tractor trailer vehicle body stay within the mapped permissible area as much as possible.

Generation of a penalty for body movement out of the mapped permissible area may be performed using the check of "point in a polygon." To reduce the computation time in the optimal path library offline search process, only map edge points in a radius of the vehicle center (defined as tractor rear axle center) are evaluated. Also, points of interest on the vehicle left side are only checked at map edge points on the left side of the vehicle (so does the right side), and the process is done for the tractor and the trailer vehicle separately. If map edge point(s) are inside the polygon defined by vehicle, a penalty is generated based on the distance from the evaluated point on vehicle to the map edge line drawn by the nearest two map edge points. If the evaluated point is on the tire, then a penalty jump is further added. Since the polygon by vehicle shape is convex, an interior check can be done by determining if the point is always on the same side of the vector circle defined by the carriage. Using the equation below, if the generated penalty $a_{i,j}$ by point i with respect to the four edge vectors are all with same sign, then the map edge point is within the vehicle body polygon and the corresponding penalty generates:

$$a_{i,j}=(y_t-y_{0,j})(x_{t,j}-x_{0,j})-(x_t-x_{0,j})(y_{t,j}-y_{0,j})$$ Equation 1.

In Equation 1, $(x_t, y_t)$ represent coordinates of a point on the map, j is a variable corresponding to the vehicle edge vectors (typically 4, for four edges), and $(x_{0,j}, y_{0,j})$ and $(x_{t,j}, y_{t,j})$ represent starting positions of the vehicle and a position at vehicle at time t. At 460, the overall performance of a particular arc path may be determined by adding the values of the metrics together, or a weighting the metrics more heavily than others to cause some metrics to have a larger impact on the overall performance metric compared to other metrics.

At 470, an evaluation may be performed on the arc path based on the overall performance in light of the metric values. Any of the metrics may have ranges of acceptable values. If a metric lies outside the range, the arc may be avoided or not selected.

The disclosed method for offline path library generation is mathematically provable to be a globally optimal path given a set of performance metrics (also referred to as cost metrics). The method of finding the optimal path includes searching all possible actions that can be taken by the tractor-trailer and evaluating the performance/cost metrics, starting from the desired terminal state point. From a search starting location, which is also a terminal state location, a family of paths exist where sections of each path may be represented by nodes. Each node corresponds to a family of parameter values including an x coordinate, a y coordinate and a heading angle. The nodes together may be referred to as a state space and each node as a state space node. Each state space node of the map region links the decisions of preceding choices to get to that node including accumulated historical action metric values and costs. Due to an optimality principle, the generated optimal path library finds the global optimal path and actions for any given vehicle location and orientation state within the map and maintains finite computation memory and time usage in the offline search process.

The disclosed offline path library generation method may be exhaustive to any given discretized vehicle location and orientation within the mapped range, and all of the paths originating from a vehicle starting state converge into one optimal path for the mapped area. This property robustly handles all potential autonomous driving states in the defined map region, and a selected path promotes the autonomous vehicle's motion control on stability convergence performance. The property of common convergence trace provides predictability merit on vehicle path and motion planning, which is helpful for autonomous driving safety protection. To achieve exhaustive search results for a vehicle heading angle state while guaranteeing smoothness in the path, the disclosed method develops a dynamic resolution technique that dynamically generates the heading angle resolution grid values based on optimal solution local progressing at each position state instance.

To compress the exhaustive optimal path library into less memory, the optimal paths are stored in the analytical solution form of arc segments across the path states. Each arc piece corresponds to an arc from one path state to another path state. The enumeration of optimal paths is compressed from long numerical vectors with high dimensions into a guided low-dimensional compact vector library through analytical arc solutions and node linkage information. The optimal path to an endpoint given the starting position and orientation can be extracted and expanded into a path array in cartesian space for any discrete space resolution requirements (either fixed or variable) using a path library reading key. Look-up of the optimal path is ultra-fast (roughly 5 milliseconds depending on the total path length) and use minimal online computational resources (at only order of n, represented as o(n), level memory, in comparison an online path planner needs at least $o(n^2)$ level memory). The disclosed technique transfers the heavy computational load of autonomous tractor-trailer vehicle path planning from an online process to an offline process. For the online process, all that is required is that the optimal path be read by the vehicle onboard computer.

Figure 5A:
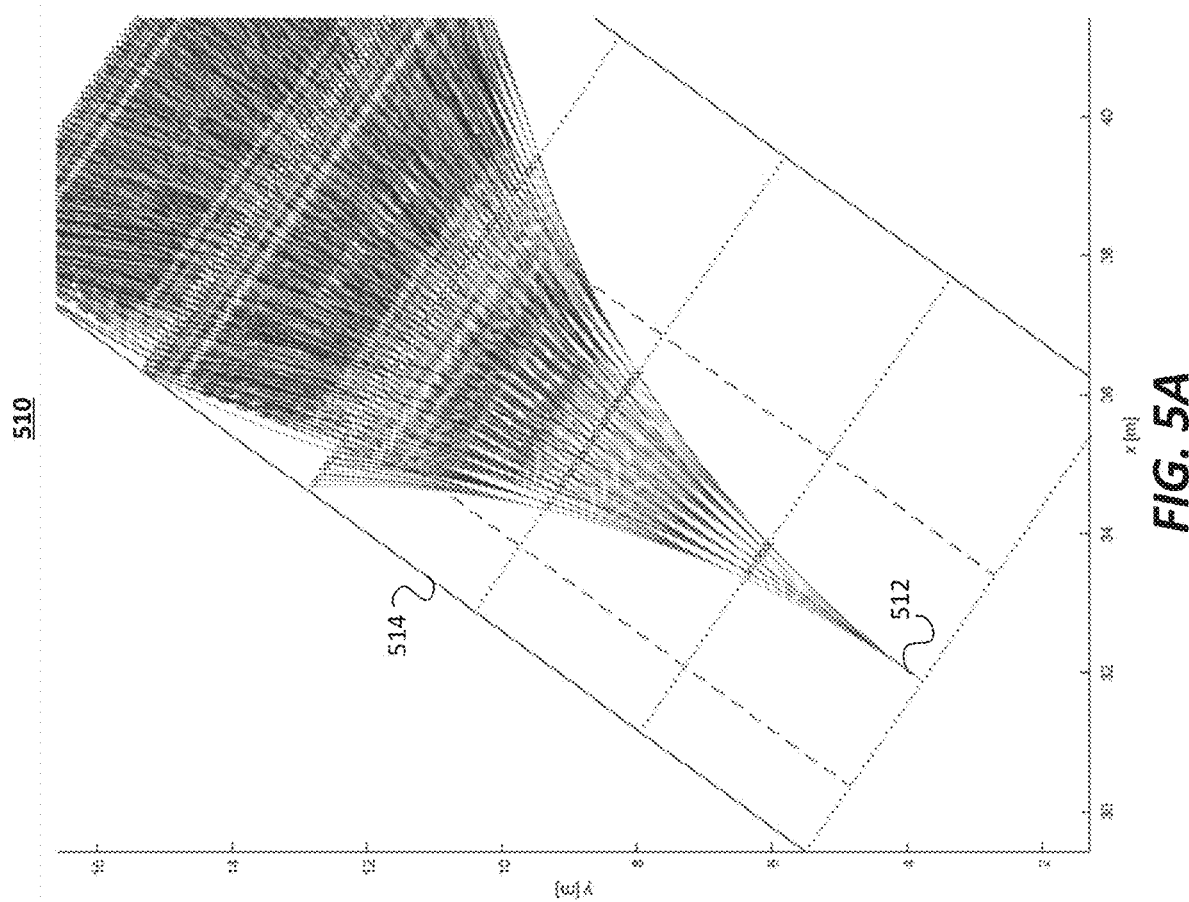
FIG. 5A depicts an example of offline searching for a family of arc paths from a target ending location and orientation to all possible starting locations and orientations in the mapped area with a discrete resolution.

FIG. 5A depicts an illustration at 510 of a family of arc paths originating at an ending location for an autonomous vehicle. Shown at 512 is an example of an ending location for an autonomous vehicle which is also the starting location for searching optimal paths that lead to the designated ending location for all nodes on the state space in the reverse direction. Fanning out from ending location 512 are a family of possible arc (or path) segments. Each arc segment begins at a node and ends at another node. Arc segments are pruned to remove nodes that cannot be reached based on limitations of the vehicle such as a tractor-trailer. The arc segments shown at 510 are all the possible arc segments origination at 512 before the optimal path is chosen from a starting location.

Figure 5B:
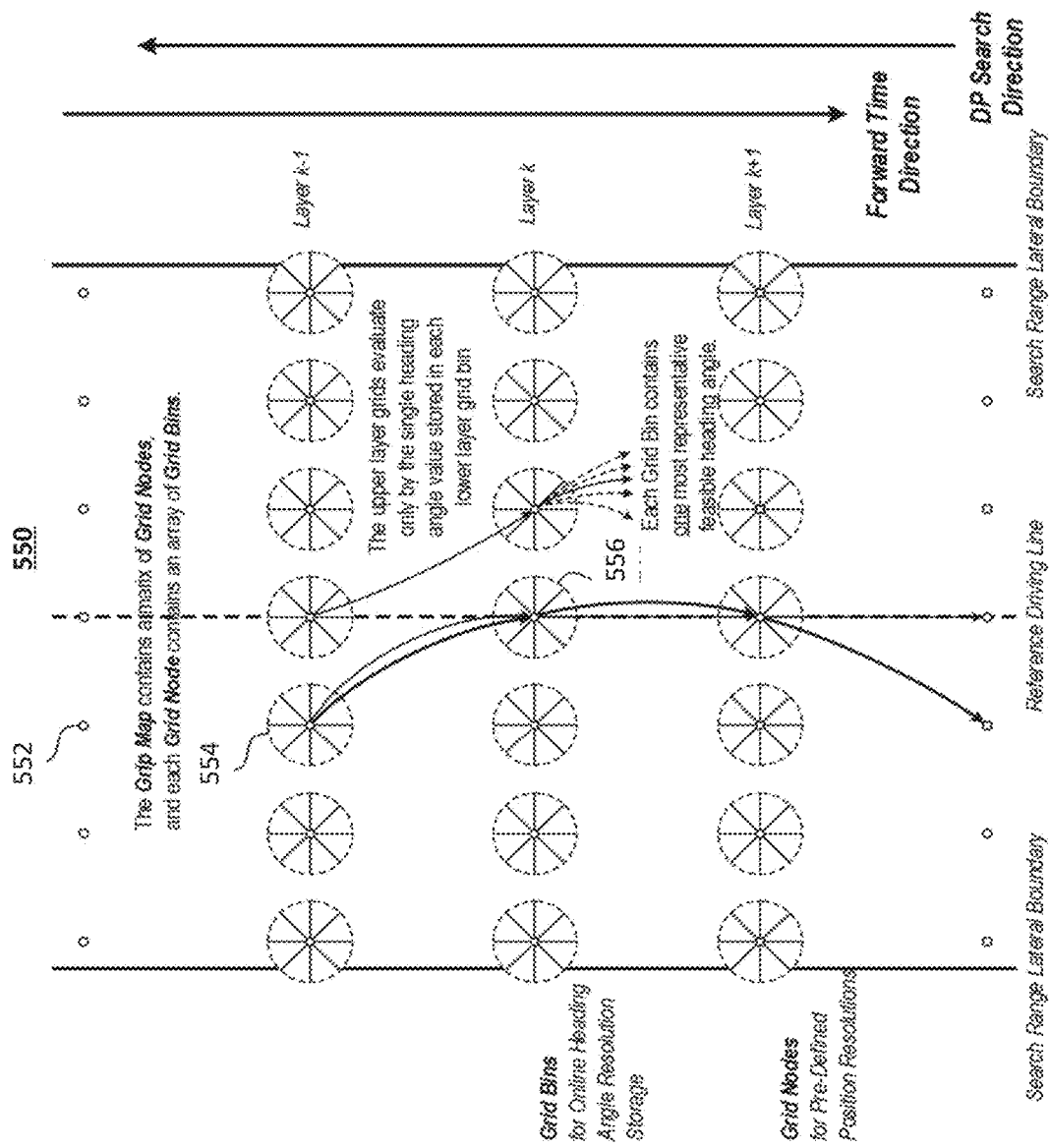
FIG. 5B depicts an example of position grid nodes connected with path arcs through various heading angle grid bins, in accordance with some embodiments.

FIG. 5B depicts an illustration at 550 of locations or points in a grid map with bins and nodes. Shown at 550 are examples of grid points with associated bins and nodes. The map of an area may be overlaid by a grid map which contains regularly spaced grid nodes including grid node 552. Each node includes grid bins such as grid bin 554. The spacing between grid nodes is determined by a predefined resolution. For example, for a given map a higher resolution grid map includes more total grid nodes than a grid map with a lower resolution grid map. Each grid bin contains a most feasible heading angle for the vehicle to travel from the corresponding grid node. Upper layer grid bins such as grid bin 554 corresponding to earlier driven locations (and later searched locations) evaluate to determine a possible path based on the single heading angle stored in the next lower grid bin such as grid bin 556.

Figure 6:
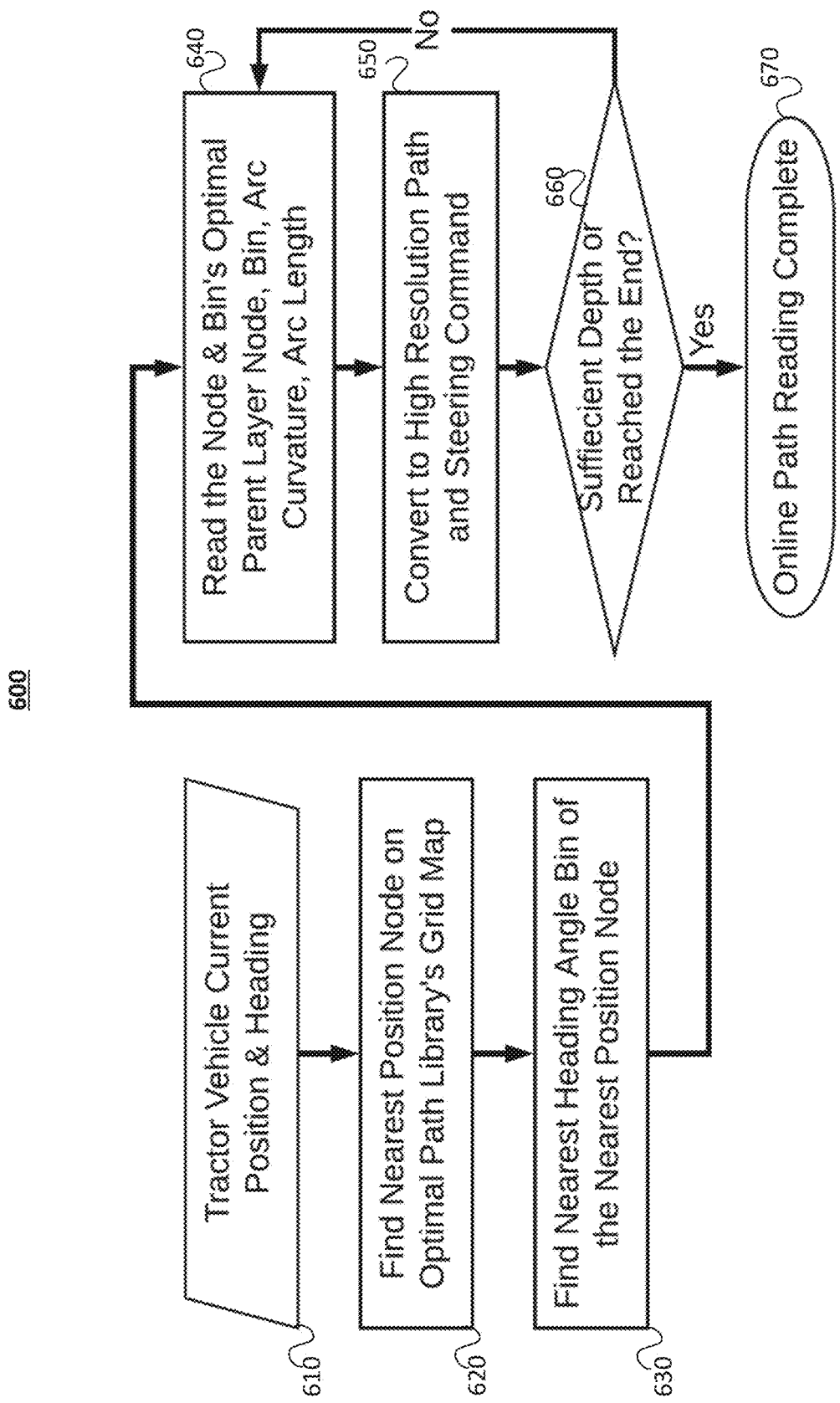
FIG. 6 depicts an example of an online reading process for online optimal path library usage, in accordance with some embodiments.

FIG. 6 depicts a process 600 for determining an optimal path, in accordance with some example embodiments. At 610, the vehicle/tractor-trailer position and heading are determined. At 620, the position of the tractor-trailer is matched to the closest grid node in the mapped area and included in the path library. At 630, the bin with the closest heading angle to the vehicle heading is selected. At 640, the optimal parent layer node, bin, arc curvature, and arc length are read based on the matched grid node and the selected vehicle heading. The arc curvature may be expressed as the inverse of the constant steering radius needed to follow the curved path between two grid nodes and the arc length is the length of the curved path between the corresponding grid nodes along the arc curvature. The parent node is the next node farther away towards the endpoint. At 650, the parent node location, arc curvature, and arc length are converted to a steering command to send to the autonomous steering controller. At 660, if the desired terminal location is reached, then the process stops. If the desired terminal location is not reached, then the process returns to step 640 and repeats until the desired terminal point is reached. At 670, the optimal path has been read.

The size of an optimal path library affects the online memory usage, since the online map is stored at the vehicle. The optimal map size M can be estimated using:

$$M = \frac{W_{SP}}{dW} \cdot \frac{360}{d\theta} \cdot \frac{L_{SP}}{dL} \cdot N_u \cdot B,\qquad\text{Equation 2.}$$

where $W_{SP}$ is the width of the offline path search region. A two-lane width of search path is actually equivalent of allowing vehicle body to occupy three lanes, since the search point of interest is located at the vehicle longitudinal center line. Considering the typical lane width is at 3.7 m, the search path width can be estimated at 7.4 m.

dW is the lateral distance resolution. dW=0.1 m has been determined as sufficient resolution accuracy.

dθ is the heading angle resolution. dθ=1 deg has been determined as sufficient resolution accuracy.

$L_{SP}$ is the total longitudinal distance of the offline path search region along the reference driving line.

dL is the longitudinal distance resolution between two lateral search layers. dL=3 m has been determined as sufficient resolution accuracy, even for the local turns being highly challenging for experienced human drivers.

$N_u$ is the number of variables in the optimal path map at each search step, which includes the processed grid node and bin's (1) heading angle value, (2) path curvature of the arc connection to the parent layer node, (3) path arc length of the arc connection to the parent layer node, (4) Parent layer lateral location grid node index of the path grid map, (5) Parent layer heading angle bin index of the path grid map.

B is the number of bits needed for storing each variable. The optimal path map contains 3 variables of single-precision floating point data, and 2 variables of integer data. Therefore, the total $N_u$*B is at 3*4+2*2=16 Byte.

An example estimate of dynamic programming optimal map size for a 1 kilometer path is approximately 142 Megabytes (Mb) memory. However, not all elements in the optimal path grid map is occupied with information, and smarter techniques can be applied to make the size smaller. For example, the useful part of heading angle search range is much less than 360 degrees, and the reachable range at each search step is even smaller. As a reference, the equivalent map stored by MatLab only takes 28 Mb memory. Furthermore, the dynamic programming path planning method only needs to be applied for the challenging wide turns. When long straight lanes exit, the vehicle path does not need to be refined in such a way. Therefore, a "compact 1 km path" as an example contains the wide turn path information of a much longer route.

Figure 7:
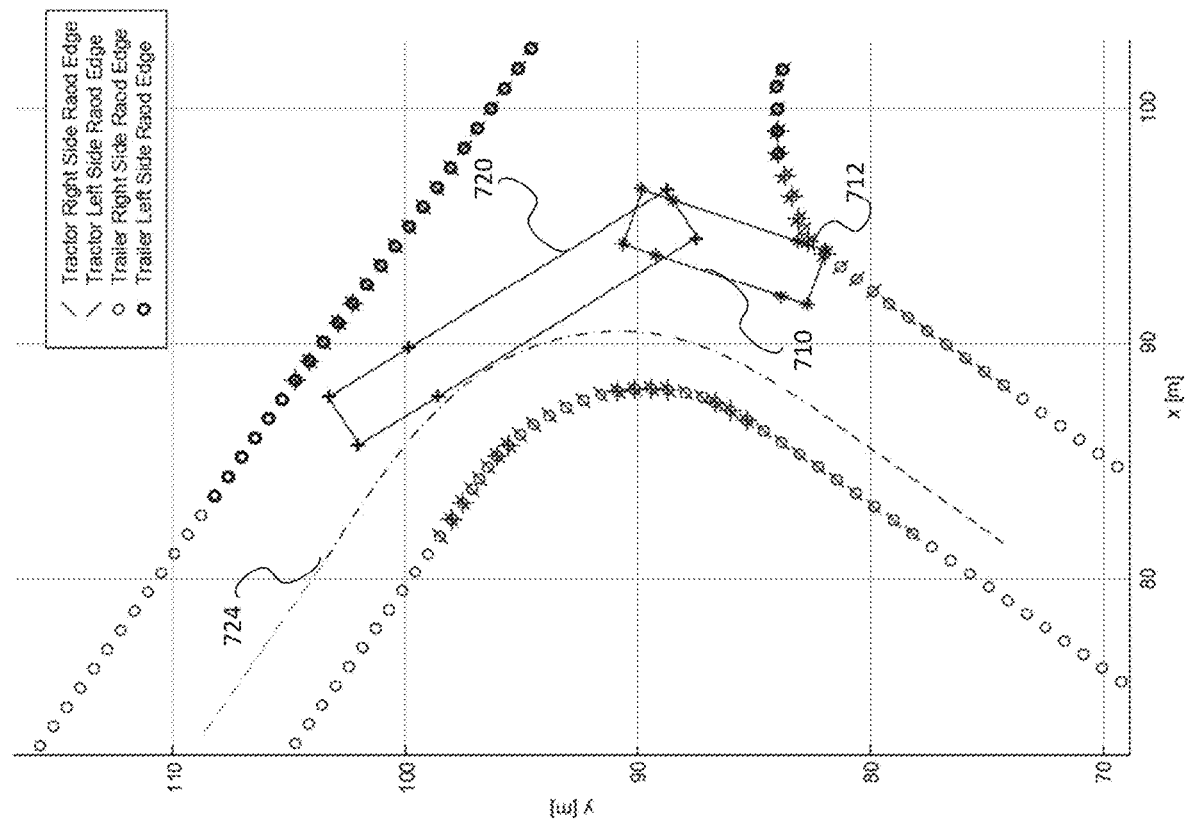
FIG. 7 depicts an example of a turn with a tractor trailer showing the various parts of the tractor-trailer with the relationships of the lane boundaries or road edges of the driving space, for generating penalties or costs of at least one of the performance metrics including body in lane metric, or body extends beyond a mapped permissible area metric, in accordance with some embodiments.

FIG. 7 depicts an example of a tractor 710 and a trailer 720. At 724 is an example path followed by the rear of the trailer. At 712 is an example path followed by the front of the tractor. The disclosed subject matter determines an optimal path around the curve shown in FIG. 7 (or any other curve).

Figure 8A:
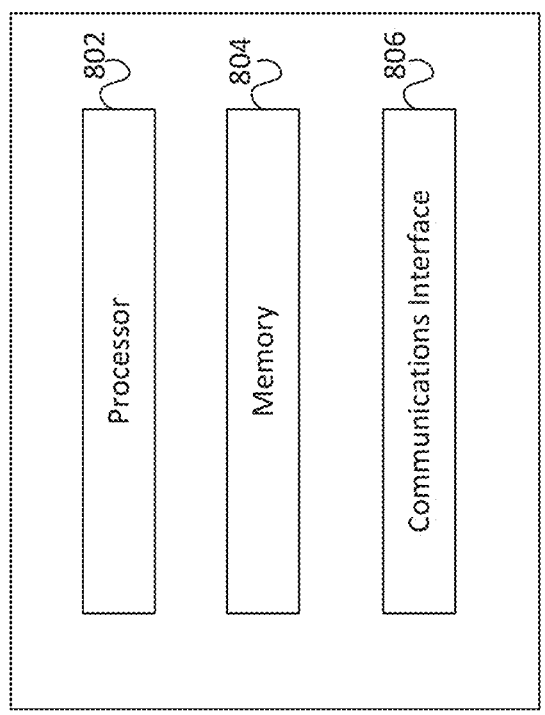
FIG. 8A depicts an example of a hardware platform.

FIG. 8A depicts an example of a hardware platform 800 that can be used to implement some of the techniques, processes, and/or functions described in the present document. For example, the hardware platform 800 may implement the processes 150, 300, 400, 510, 550, 600, 820, 830, 840 or other processes described above, and/or may implement the various modules described herein. The hardware platform 800 may include a processor 802 that can execute code to implement a method. The hardware platform 800 may include a memory 804 that may be used to store processor-executable code and/or store data. The hardware platform 800 may further include a communication interface 806. For example, the communication interface 806 may implement one or more wired or wireless communication protocols (Ethernet, LTE, Wi-Fi, Bluetooth, and so on). The hardware platform 800 may be used for implementing the offline server or the online server described herein.

Figure 8B:
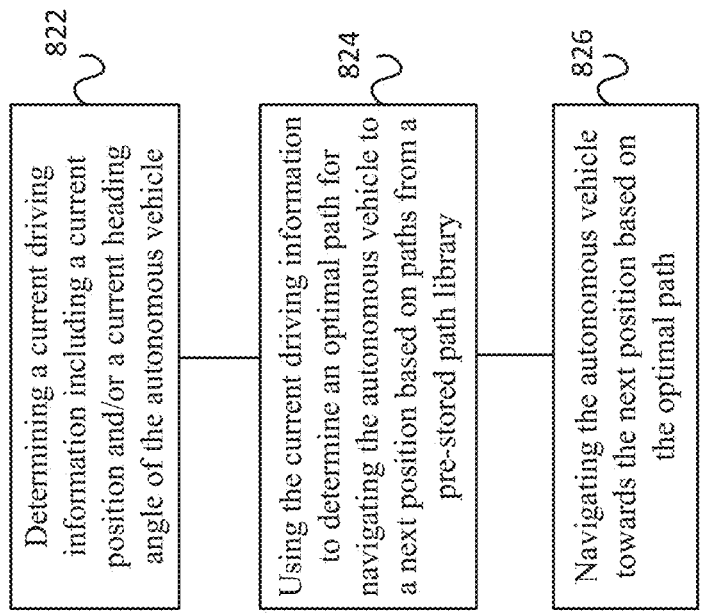
FIG. 8B is a flowchart of an example method of autonomous vehicle operation.

FIG. 8B is a flowchart of a method 820 for navigating an autonomous vehicle. The method includes, at 822, determining, by an online server, a current driving information including a current position and/or a current heading angle of the autonomous vehicle. The online server is, for example, located on the autonomous vehicle.

The method 820 includes, at 824, using the current driving information to determine an optimal path for navigating the autonomous vehicle to a next position based on paths from a pre-stored path library. In some implementations, the pre-stored path library may be a database of possible paths that is computed based on an offline path library generation process. In some embodiments, the pre-stored path library may be stored in a compressed format such that the online server performs data expansion for receiving the possible paths.

The method 820 includes, at 826, navigating the autonomous vehicle towards the next position based on the optimal path. For example, the current position and the next position may be a grid node along a discretized grid map of the area in which the autonomous vehicle is operating, as described next.

The method 820 may further include determining, a grid node matching the current position and a grid bin associated with the grid node based on a current heading angle of the autonomous vehicle on a grid map in the pre-stored path library, retrieving, from the pre-stored path library, possible paths to a next grid node corresponding to the next position and a next grid bin based on the grid node and the grid bin, and generating, based on one of the possible paths, a steering command to navigate the autonomous vehicle. In some embodiments, the grid may be uniform over the entire area through which the autonomous vehicle is navigating. Alternatively, in some embodiments, the grid density, e.g., the placement of grid nodes, may be non-uniform. For example, near corners, grid nodes may be placed closer to each other, while in open areas grid nodes may be placed farther apart. The non-uniform gridding may enable provide more accurate maneuvering around critical areas such as corners, while keeping overall complexity of computation in an area about the same as uniform gridding, over even reduced, compared to uniform gridding.

The method 820 may further include that the online server iteratively generates multiple steering commands to navigate the autonomous vehicle between multiple current positions and multiple next positions based on multiple optimal paths retrieved from the pre-stored path library such that a next position of a previous iteration is used as a current position of a next iteration until and end criterion is met by the autonomous vehicle. The steering commands may include, for example, a vehicle front wheel steering angle command, or a vehicle steering handwheel angle command, or a steering torque command to the steering actuator at a vehicle longitudinal wheel speed. Steering commands may also include activating or deactivating turn signals when the vehicle exceeds or falls below a curve angle in the optimal path to the next position.

Figure 8C:
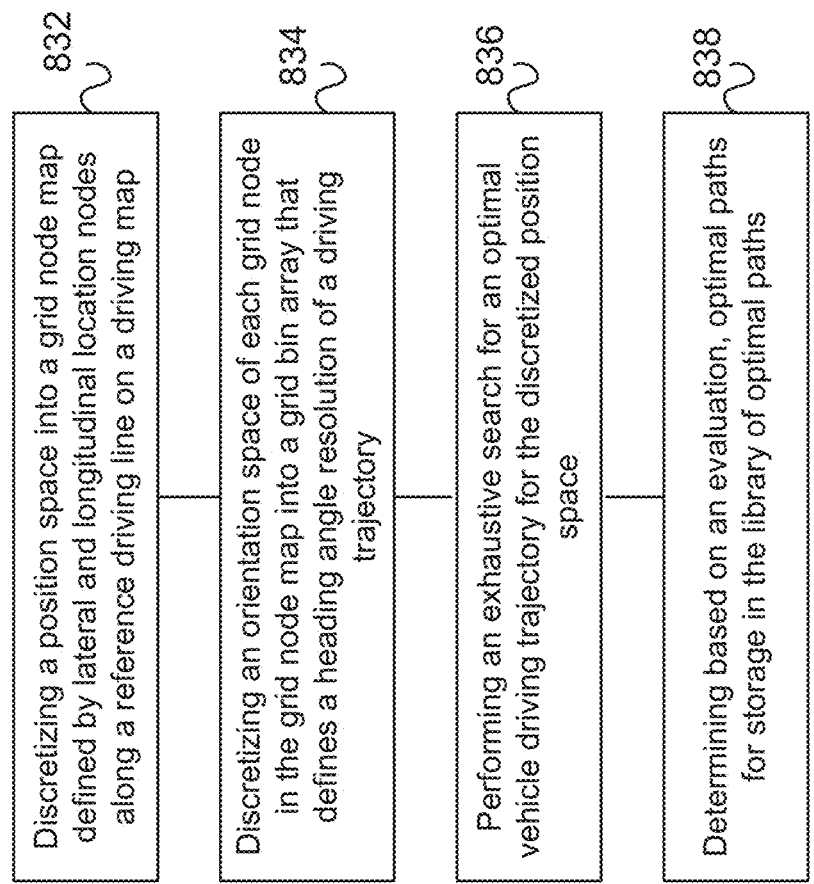
FIG. 8C is a flowchart of an example method for generating a library of optimal paths that can be used for autonomous vehicle navigation.

FIG. 8C shows a flowchart for an example method 830 for generating a library of optimal paths for an autonomous vehicle operation. The method 830 may be implemented by an offline server.

The method 830 includes, at 832, discretizing, by an offline server, a position space into a grid node map defined by lateral and longitudinal location nodes along a reference driving line on a driving map. As described above, in some embodiments, the discretization may be performed using a uniform grid. Alternatively, a non-uniform grid may be used in some embodiments.

The method 830 includes, at 834, discretizing, by the offline server, an orientation space of each grid node in the grid node map into a grid bin array that defines a heading angle resolution of a driving trajectory. Similar to the differing strategies of uniform vs non-uniform gridding options, the heading angle resolution may also be either uniformly discretized or may be non-uniformly discretized based on map features. For example, uniform discretization may be a straightforward gridding strategy based on a geographical resolution (e.g., divide a map region in 1 meter×1 meter grid bins). Alternatively, the angle discretization may take into account certain map features, e.g., corners, objects along the path that are to be avoided such as billboards or light poles such that a finer heading angle resolution is used in areas where such map features are present, while coarser heading angle resolution may be used in open areas.

The method 830 includes, at 836, performing, by the offline server, an exhaustive search for an optimal vehicle driving trajectory for the discretized position space, wherein the exhaustive search includes vehicle state vectors, wherein the exhaustive search includes evaluating driving trajectory connections between every two pairs of state space and grid nodes on two layers along a reference driving direction in the driving space to determine a best driving action leading to global optimal complete trajectories.

For example, the offline server may perform the evaluating operation by: constructing a trajectory arc between two grid nodes following a vehicle kinematic model by tracing from a trajectory heading angle of an optimal trace stored in a lower layer grid node's evaluated grid bin, wherein trajectory heading angle values stored in an upper layer grid nodes' grid bins are determined dynamically as generating the library proceeds, assigning costs for all of the trajectory connections to a layer of grid nodes, and saving optimal trajectory connections to every reachable grid node and grid bin pair, and deactivating grid node and grid bin pairs for the next layer's search evaluation when at least one criteria is violated. Here, an evaluation at each step further proceeds by expanding a vehicle kinematic trace defined by a bicycle model between every two feasible grid nodes into traces for tractor-trailer vehicles that accommodates trailer motion states, and into traces of vehicle body corners and vehicle tires that relate to motion control when driving in a confined space. Furthermore, in some embodiments, the linkage information for optimal trajectory connections is saved to the optimal path library.

The method 830 includes, at 838, determining, by the offline server based on an evaluation, optimal paths for storage in the library of optimal paths.

In some implementations, for implementation of the method 830, each grid node defines one deterministic location coordinate set before the search starts, and each grid bin defines a memory space for a range of orientation angles of which a specific value will be determined dynamically as generating the library proceeds.

In some embodiments of the method 830, the search process repeats by repeating the evaluating the driving trajectory connections, the expanding the vehicle kinematic trace, and the keeping only the optimal trajectory connections to every reachable pair of grid nodes for each unevaluated layer of grid nodes until reaching the other margin of the interested area on the map which corresponds to the margin of searchable space of the map area.

In some embodiments, the location grid node map and grid bin array are a state space grid map. A state space grid map may, for example, logically link grid nodes with respect to each other's position, e.g., for each grid node, the state space map may include incoming links to other grid nodes from which the grid node can be reached along n paths (n being an integer, typically equal to 1) and outgoing links to other grid nodes that can be reached within m paths (m being an integer, typically equal to 1).

In some embodiments, each vehicle state vector is defined by a vehicle x-coordinate value, a vehicle location y-coordinate value, and a vehicle heading angle value. As previously described, the (x, y, angle) triplet for the vehicle state vector may span a uniform or a non-uniform resolution in the three axes domains (x, y, angle).

In some embodiments, the exhaustive search is performed in a backward direction from the terminal state to a starting state, and only a cumulative optimal solution is saved for each reachable discretized state space grid node in the searched region.

In some embodiments, the terminal state defines a margin of the searchable space of the map area.

In some embodiments, the offline server determines and stores the optimal paths prior to the autonomous driving vehicle arriving at the position space. For example, the optimal path library may be pre-loaded on an onboard storage prior to the autonomous vehicle commencing its journey.

Figure 8D:
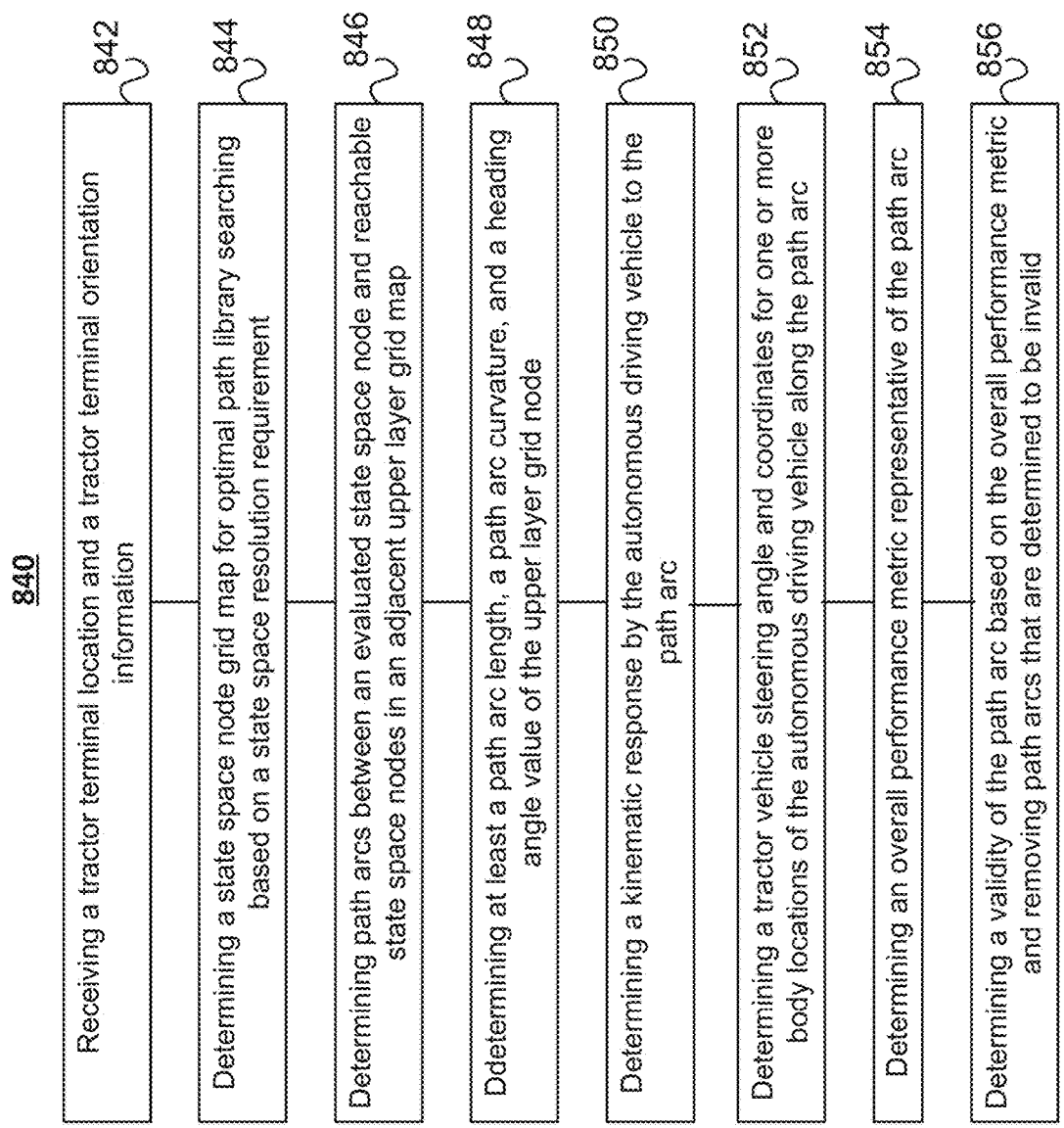
FIG. 8D is a flowchart of another example method for generating a library of optimal paths that can be used for autonomous vehicle navigation.

FIG. 8D is a flowchart for an example method 840. The method 840 may be implemented by offline server for generating a library of optimal paths for an autonomous driving vehicle. An optimal path may be, for example, a path that avoids collision and/or minimizes steering changes, and/or prevents jack-knifing and/or smooth and within lane boundaries.

The method 840 includes, at 842, receiving, at an offline server, a tractor terminal location and a tractor terminal orientation information.

The method 840 includes, at 844, determining, at the offline server, a state space node grid map for optimal path library searching based on a state space resolution requirement.

The method 840 includes, at 846, determining, at the offline server, path arcs between an evaluated state space node and reachable state space nodes in an adjacent upper layer grid map.

The method 840 includes, at 848, determining, at the offline server, from a path arc from the path arcs, at least a path arc length, a path arc curvature, and a heading angle value of the upper layer grid node.

The method 840 includes, at 850, determining, at the offline server, a kinematic response by the autonomous driving vehicle to the path arc.

The method 840 includes, at 852, determining, at the offline server, from the kinematic response, a tractor vehicle steering angle and coordinates for one or more body locations of the autonomous driving vehicle along the path arc.

The method 840 includes, at 854, determining, at the offline server, an overall performance metric representative of the path arc by applying performance metrics to the path arc, the steering controller steering angle, the kinematic response, and the one or more body locations along the path arc. In various embodiments, various performance metrics may be used. For example, the performance metrics may include one or more of a curvature metric, a curvature change metric, an articulation metric, a distance to lane center metric, a lane heading angle tracking accuracy metric, a body in lane metric, a body extends beyond a mapped permissible area metric.

The method 840 includes, at 856, determining, at the offline server, a validity of the path arc based on the overall performance metric and removing path arcs that are determined to be invalid.

In some embodiments, the method 840 includes repeating the determining the path arcs, the determining the at least the path arc length, the path arc curvature, the heading angle value, the determining the kinematic response, and the determining the overall performance metric to generate a plurality of arc paths and corresponding overall performance metrics.

In some embodiments, the method 840 includes selecting an optimal path from the plurality of arc paths based on the overall performance metrics, wherein the optimal path has a best overall performance metric compared to other of the plurality of arc paths.

In some embodiments, a system for navigating an autonomous vehicle includes an offline server configured to generate a library of optimal paths for navigating a geographic area, wherein the geographic area is represented as a grid node map and an orientation grid bin map and wherein the optimal paths correspond to paths between pairs of grid node pairs in the grid node map based on optimization criteria; a storage device on the autonomous vehicle for storing the library of optimal paths, and an online server located on the autonomous vehicle configured to access information from the library of optimal paths from the storage device based on a current position and a current heading of the autonomous vehicle, and navigating the autonomous vehicle through the geographic area based on the information. The online server may be configured to implement a method described herein. The offline server may be configured to generate a library of optimal paths using a method described herein.

The offline server described in the present document may be implement using a hardware platform (e.g., FIG. 11) or may be implemented using distributed computing resources such as cloud computing resources. To be able to perform an exhaustive analysis of possible optimal paths, the offline server may use computational resources that are greater than the computational resources that are available to online, or on-board, computers in an autonomous vehicle. The autonomous vehicle and the online computer may communicate with the offline server via a communication interface such as a cellular or a Wi-Fi wireless communication channel or an ethernet or USB cable before a driving trip begins.

In some embodiments, the library of paths represents an exhaustive search for optimal vehicle driving trajectories for a predefined and discretized driving space, and wherein the exhaustive search includes a plurality of combinations of vehicle location and vehicle orientation in the state space node grid map. In some embodiments, the library includes compact path information for vehicle states in a geographic area.

Figure 9:
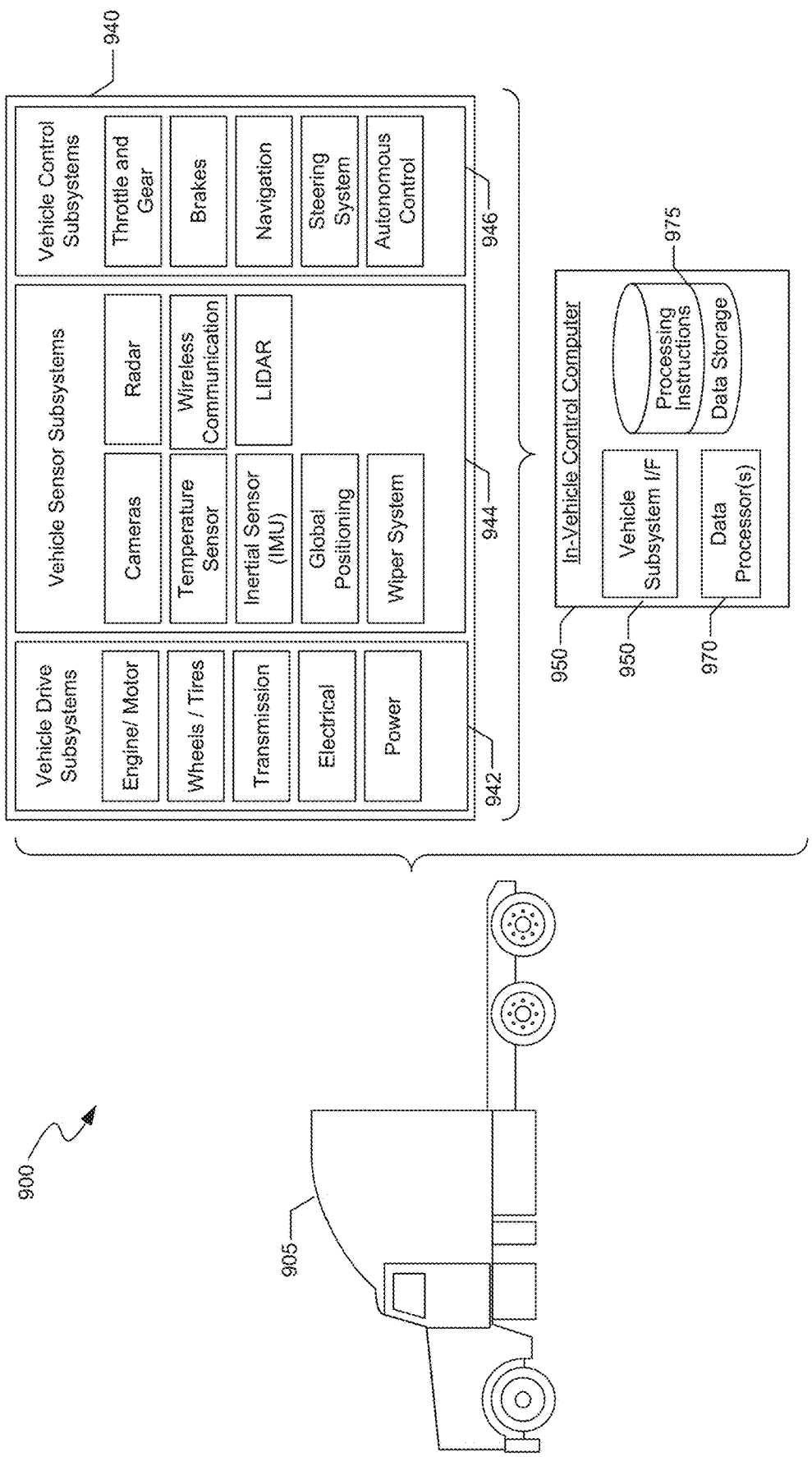
FIG. 9 shows a block diagram of an example vehicle ecosystem in which autonomous driving operations can be performed.

FIG. 9 shows a block diagram of an example vehicle ecosystem 900 in which autonomous driving operations can be determined. The vehicle ecosystem 900 may be used to implement the online server and its operations related to path selection and vehicle steering.

As shown in FIG. 9, the vehicle 905 may be a semi-trailer truck. The vehicle ecosystem 900 includes several systems and components that can generate and/or deliver one or more sources of information/data and related services to the in-vehicle control computer 950 that may be located in a vehicle 905. The in-vehicle control computer 950 can be in data communication with a plurality of vehicle subsystems 940, all of which can be resident in the vehicle 905. A vehicle subsystem interface 960 is provided to facilitate data communication between the in-vehicle control computer 950 and the plurality of vehicle subsystems 940. In some embodiments, the vehicle subsystem interface 960 can include a controller area network (CAN) controller to communicate with devices in the vehicle subsystems 940.

The vehicle 905 may include various vehicle subsystems that support of the operation of vehicle 905. The vehicle subsystems may include a vehicle drive subsystem 942, a vehicle sensor subsystem 944, and/or a vehicle control subsystem 946. The components or devices of the vehicle drive subsystem 942, the vehicle sensor subsystem 944, and the vehicle control subsystem 946 as shown as examples. The vehicle drive subsystem 942 may include components operable to provide powered motion for the vehicle 905. In an example embodiment, the vehicle drive subsystem 942 may include an engine or motor, wheels/tires, a transmission, an electrical subsystem, and a power source.

The vehicle sensor subsystem 944 may include a number of sensors configured to sense information about an environment or condition of the vehicle 905. The vehicle sensor subsystem 944 may include one or more cameras or image capture devices, one or more temperature sensors, an inertial measurement unit (IMU), a Global Positioning System (GPS) transceiver, a laser range finder/LIDAR unit, a RADAR unit, and/or a wireless communication unit (e.g., a cellular communication transceiver). The vehicle sensor subsystem 944 may also include sensors configured to monitor internal systems of the vehicle 905 (e.g., an O2 monitor, a fuel gauge, an engine oil temperature, etc.).

The IMU may include any combination of sensors (e.g., accelerometers and gyroscopes) configured to sense position and orientation changes of the vehicle 905 based on inertial acceleration. The GPS transceiver may be any sensor configured to estimate a geographic location of the vehicle 905. For this purpose, the GPS transceiver may include a receiver/transmitter operable to provide information regarding the position of the vehicle 905 with respect to the Earth. The RADAR unit may represent a system that utilizes radio signals to sense objects within the local environment of the vehicle 905. In some embodiments, in addition to sensing the objects, the RADAR unit may additionally be configured to sense the speed and the heading of the objects proximate to the vehicle 905. The laser range finder or LIDAR unit may be any sensor configured to sense objects in the environment in which the vehicle 905 is located using lasers. The cameras may include one or more devices configured to capture a plurality of images of the environment of the vehicle 905. The cameras may be still image cameras or motion video cameras.

The vehicle control subsystem 946 may be configured to control operation of the vehicle 905 and its components. Accordingly, the vehicle control subsystem 946 may include various elements such as a throttle and gear, a brake unit, a navigation unit, a steering system and/or an autonomous control unit. The throttle may be configured to control, for instance, the operating speed of the engine and, in turn, control the speed of the vehicle 905. The gear may be configured to control the gear selection of the transmission. The brake unit can include any combination of mechanisms configured to decelerate the vehicle 905. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the vehicle 905. The navigation unit may additionally be configured to update the driving path dynamically while the vehicle 905 is in operation. In some embodiments, the navigation unit may be configured to incorporate data from the GPS transceiver and one or more predetermined maps so as to determine the driving path for the vehicle 905. The steering system may represent any combination of mechanisms that may be operable to adjust the heading of vehicle 905 in an autonomous mode or in a driver-controlled mode.

The autonomous control unit may represent a control system configured to identify, evaluate, and avoid or otherwise negotiate potential obstacles in the environment of the vehicle 905. In general, the autonomous control unit may be configured to control the vehicle 905 for operation without a driver or to provide driver assistance in controlling the vehicle 905. In some embodiments, the autonomous control unit may be configured to incorporate data from the GPS transceiver, the RADAR, the LIDAR, the cameras, and/or other vehicle subsystems to determine the driving path or trajectory for the vehicle 905.

Many or all of the functions of the vehicle 905 can be controlled by the in-vehicle control computer 950. The in-vehicle control computer 950 may include at least one data processor 970 (which can include at least one microprocessor) that executes processing instructions stored in a non-transitory computer readable medium, such as the data storage device 975 or memory. The in-vehicle control computer 950 may also represent a plurality of computing devices that may serve to control individual components or subsystems of the vehicle 905 in a distributed fashion.

The data storage device 975 may contain additional instructions as well, including instructions to transmit data to, receive data from, interact with, or control one or more of the vehicle drive subsystem 942, the vehicle sensor subsystem 944, and the vehicle control subsystem 946. The in-vehicle control computer 950 can be configured to include a data processor 970 and a data storage device 975. The in-vehicle control computer 950 may control the function of the vehicle 905 based on inputs received from various vehicle subsystems (e.g., the vehicle drive subsystem 942, the vehicle sensor subsystem 944, and the vehicle control subsystem 946).

Figure 10:
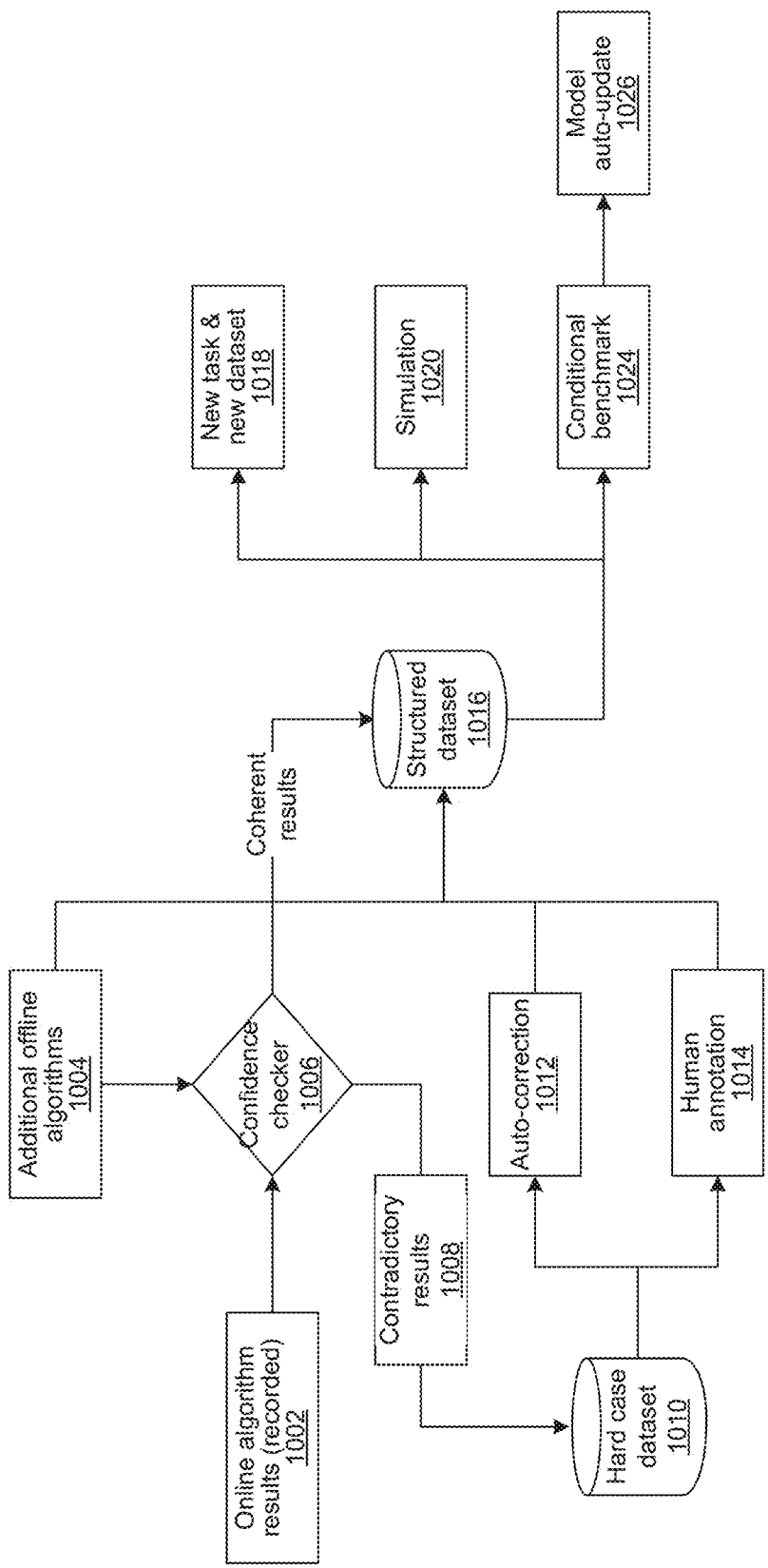
FIG. 10 shows an exemplary flowchart for software-controlled operation of an autonomous vehicle.

FIG. 10 shows an exemplary process for updating a software-based control of autonomous vehicles. This process may be implemented by the online server. In the updating process, a confidence checker module may perform a confidence checking operation 1006 using online algorithm results (1002) and offline algorithm results (1004) obtained from previous operation of the autonomous vehicle. At operation 1002, a confidence checker module of a computer (e.g., FIG. 11 at 1125) a result of online algorithms that have been performed by an in-vehicle control computer to perform autonomous driving related operations. Online algorithm results may include a first set of data that describes autonomous driving operations in response to a known scenario. For example, the first set of data related to autonomous driving operations may include the in-vehicle control computer determining that a steering wheel motor needs to be turned 15 degrees clockwise to steer the autonomous vehicle when the autonomous vehicle reaches a known intersection. The first set of data related to autonomous driving operations may also provide status information of the various aspects of the autonomous vehicle, (e.g., speed, brake amount, transmission gear) when the autonomous vehicle is being driven through the known scenario.

In some embodiments, the online algorithm results may include health status information of the various devices and autonomous driving software operating in the in-vehicle control computer. The health status information may include one or more error codes generated by one or more devices and/or autonomous driving software when the autonomous vehicle was being driven. The online algorithm results may include additional explanation of the reason why the error code was generated and the time when the error code was generated.

At operation 1004, the confidence checker module of the computer receives additional offline algorithms and can process the known scenario with the additional offline algorithm. In some embodiments, the additional offline algorithm may be software code that a developer or engineer has built to debug existing version of the autonomous driving software operating in the in-vehicle control computer. The result of the processing the known scenario with the additional offline algorithm can provide a second set of data that describes simulated autonomous driving operations in response to the known scenario. The second set of data may also include status information of the various aspects of the autonomous vehicle as the autonomous vehicle is simulated through the known scenario. The offline algorithms may have been corrected through intervention by a human operator, as is described in the present document.

The confidence checker module at operation 1006 can compare the first set of data with the second set of data to evaluate how the two versions of the autonomous driving software operate with the same scenario. In some embodiments, the confidence checker module can use techniques such as null hypothesis statistical testing to compare the two sets of data. The confidence checker module can determine one or more metrics that quantify the difference between the two sets of data. If the confidence checker module determines that one or more determined metrics is greater than one or more known thresholds, then the confidence checker module can determine that the difference between the two sets is significant and both sets of data are sent as contradictory results 1008 to a hard case dataset 1010 database in the computer (e.g., FIG. 11 at 1130).

The auto-correction module (e.g., FIG. 11 at 1135) can perform auto-correction operation 1012 by determining changes to the existing autonomous driving software to improve the existing autonomous driving software. In some embodiments, the changes may include determining the updates to formula(s) (or equation(s)) and/or machine learning model(s) in the existing autonomous driving software that may need to be changed to have the existing autonomous driving software yield the second set of data to the known scenario. In some embodiments, changes may include updates to the machine learning model used by the existing autonomous driving software or updates to image processing techniques to better identify moving objects (e.g., other cars, pedestrians) or static obstacles (e.g., speed bumps, stop signs, etc.) located in an area surrounding the autonomous vehicle.

The human annotation module (e.g., FIG. 11 at 1140) can perform the human annotation operation 1014 by sending to a computer monitor the first set of data, the second set of data, the existing autonomous driving software and the additional offline algorithm so that a developer or an engineer can debug or revise the existing autonomous driving software. The formula(s) and/or machine learning model(s) of the revised autonomous driving software obtained from either operation 1012 or 1014 can be sent to the structure dataset database included in the computer (e.g., FIG. 11 at 1145). In some embodiments, the human annotation module may send to a computer monitor an image for which a semantic segmentation process yielded one or more regions, where the in-vehicle control computer could not determine the identity of the one or more regions. In such embodiments, a person can assign identities for the one or more regions that the in-vehicle control computer could not identify.

Returning to operation 1006, if the results of the first and second sets of data are determined to be coherent by the confidence checker module, then the coherent results output are sent to the structure dataset 1016. The confidence checker module may determine that the first set of data and second set of data are coherent if one or more metrics that describes the difference between the two sets of data are less than one or more known thresholds. The coherent results output may include value(s), variable(s), formula(s), and/or machine learning model(s) of the existing autonomous driving software.

The value(s), variable(s), and/or formula(s) included in the structure dataset 1016 may be used to analyze new tasks and dataset 1018 or to perform simulation 1020 or to set conditional benchmarks 1024. Operations 1018-1024 may be performed by a data processing module of the computer (e.g., FIG. 11 at 1150). As an example, the data processing module can perform simulation 1020 using images or point cloud data of the known scenario based on the value(s), variable(s), and/or formula(s) stored in the structured dataset 1016. In embodiments where the structured dataset 1016 includes new value(s), variable(s), and/or formula(s) for a revised or debugged autonomous driving software version, the simulation 1020 can be performed on the new value(s), variable(s), and/or formula(s) to assess performance of the revised or debugged autonomous driving software version. For example, the simulations may be used to perform software regression testing.

The data processing module can perform conditional benchmarks 1024 using the value(s), variable(s), and/or formula(s) stored in the structured dataset 1016 for the first set of data (for the existing autonomous driving software) or for the second set of data (for the revised autonomous driving software). In some embodiments, conditional benchmark may be performed by simulating operations of a version of autonomous driving software with camera images and/or LiDAR point cloud data that are previously recorded and stored. The conditional benchmark operation can calculate one or more metrics that characterizes the overall performance of the autonomous driving software. The data processing module can automatically update a model 1026 if the data processing module determines that one or more metrics of the conditional benchmark operation 1024 exceed predetermined threshold(s). A model may include, for example, a revised autonomous driving software or a machine learning model that can be updated by the data processing module.

Figure 11:
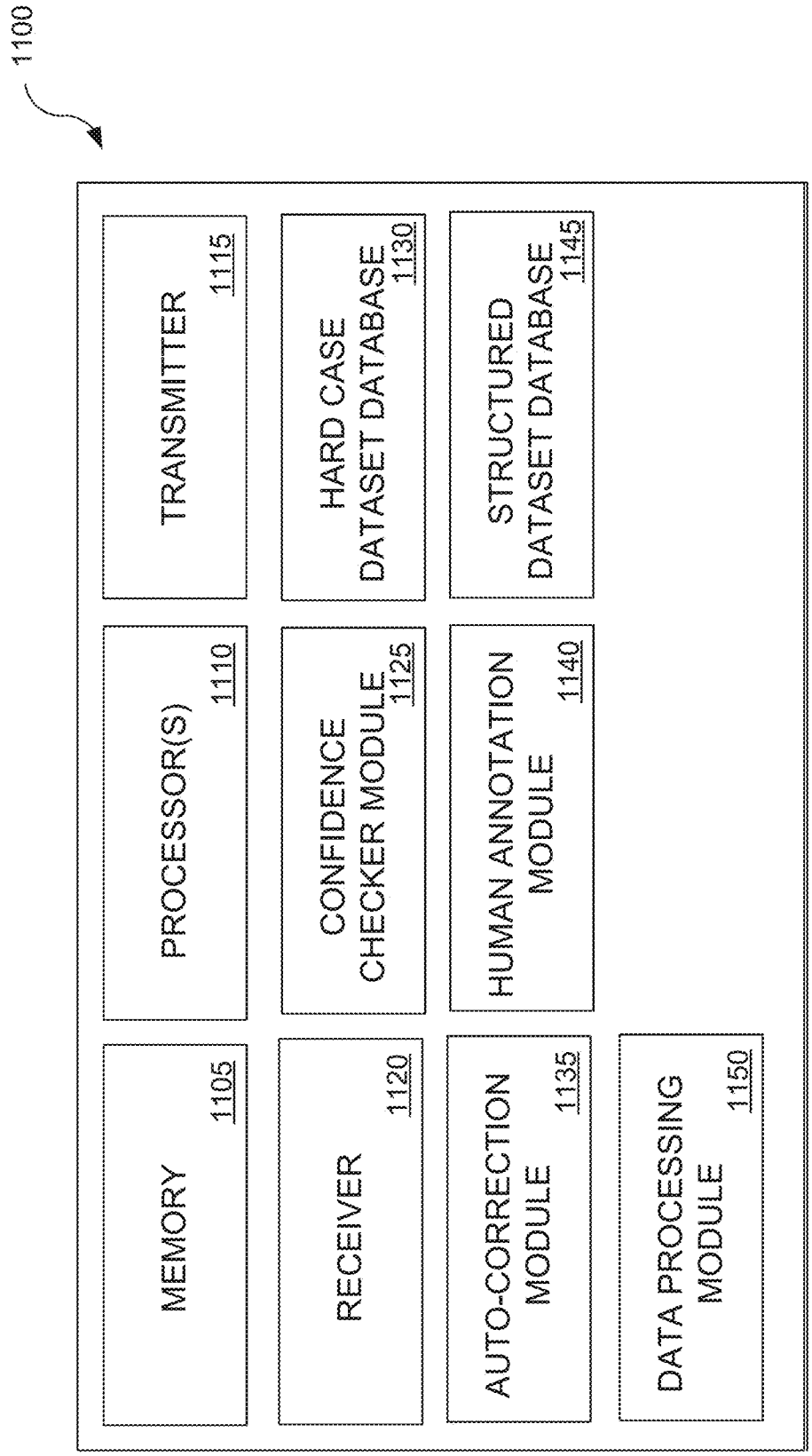
FIG. 11 shows an exemplary block diagram of a computer system for operating an autonomous vehicle.

FIG. 11 shows an exemplary block diagram of a computer that improves software that operates in an autonomous vehicle. The computer 1100 includes at least one processor 1110 and a memory 1105 having instructions stored thereupon. The instructions upon execution by the processor 1110 configure the computer 1100 and/or the various modules of the computer 1100 to perform the operations described in FIGS. 1A-10 and in the various embodiments described in this patent document. The transmitter 1115 and receiver 1120 may send and receive information, respectively.

It will be appreciated that the present document describes various techniques that can be used by autonomous vehicles for navigating the vehicle through areas that are difficult to maneuver. In one example aspect, the computation task of evaluating various vehicle path options and selecting an option for navigating the vehicle is divided into two computational platforms—one platform operates in an offline environment that is located outside and remotely from the autonomous vehicle, e.g., in a computing cloud and another platform that is located on the autonomous vehicle. The offline server may pre-perform the task of evaluating various navigational paths and provide a library of path options to the online server. The entire navigational task when maneuvering the autonomous vehicle in tight areas may be discretized into smaller path increments along grid points and the online server may make decisions regarding going from one grid point to a next grid point based on the path library. The task of selecting a next path poses significantly less computation burden that evaluating optimality of various path options, thereby enabling real time vehicle navigation without burdening on-board resources.

Implementations of the subject matter and the functional operations described in this patent document can be implemented in various systems, semiconductor devices, ultrasonic devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of navigating an autonomous vehicle, comprising:

determining, by an online server, a current location and a current heading angle of the autonomous vehicle in a mapped driving area;

receiving, by the online server from an offline path library, a path for the autonomous vehicle through the mapped driving area from the current location and the current heading angle to a destination vehicle state, wherein the mapped driving area comprises a road topology;

receiving fixed and moving obstacle information from one or more sensors on the autonomous vehicle;

adjusting the path to generate an optimized path wherein the optimized path avoids fixed and moving obstacles according to the fixed and moving obstacle information and ends at a final vehicle state, wherein the optimized path is generated by separately solving the fixed obstacles in a spatial domain using a fixed distance step size and solving the moving obstacles with respect to vehicle speed in a time domain using a fixed time step size; and navigating the autonomous vehicle based on the optimized path.

2. The method of claim 1, wherein the destination vehicle state comprises a destination location and a destination heading angle.

3. The method of claim 1, wherein the offline path library is generated by computing resources not co-located with the autonomous vehicle before navigating the autonomous vehicle, and wherein the adjusting the path comprises evaluating one or more cost functions to determine the optimized path.

4. The method of claim 3, wherein the one or more cost functions comprises a final state error that indicates a closeness between the final vehicle state and the destination vehicle state, wherein as the final vehicle state becomes closer to the destination vehicle state, the final state error becomes closer to an optimum.

5. The method of claim 1, wherein the offline path library comprises a database of possible paths that is computed based on an offline path library generation process.

6. The method of claim 1, wherein the offline path library is stored in a compressed format at an offline server, wherein the online server performs data expansion for receiving the path.

7. The method of claim 6, wherein the offline server is located external to the autonomous vehicle and is configured to communicate with the online server via a wireless communication channel when a driving mission is in process or a wired communication channel prior to a start of the driving mission.

8. The method of claim 1, wherein the path is selected from a plurality of adjusted paths based on a corresponding overall performance metric for each of the plurality of adjusted paths, wherein the path has a best overall performance metric compared to other of the plurality of adjusted paths.

9. The method of claim 8, wherein the overall performance metric for each of the plurality of adjusted paths comprises one or more of a curvature metric, a curvature change metric, and articulation metric, a distance to lane center metric, a heading angle tracking metric, a body in lane metric, a body extends beyond a mapped permissible area metric, a distance to an object on route metric.

10. A method of generating an optimal path for an autonomous driving vehicle, the method comprising:

receiving, from a localization system, a current location on a mapped driving area and a current heading angle for the autonomous driving vehicle, wherein the mapped driving area comprises a road topology;

receiving, from a path library generated offline, a path for the autonomous driving vehicle from the current location with the current heading angle to a destination location;

receiving, from a perception system, object information comprising location and size information about one or more fixed obstacles and moving obstacles along the path;

adjusting the path received from the path library in response to the object information to cause the autonomous driving vehicle to avoid the one or more fixed obstacles and moving obstacles by taking the adjusted path, wherein the adjusting the path comprises separately solving the fixed obstacles in a spatial domain using a fixed distance step size and solving the moving obstacles with respect to vehicle speed in a time domain using a fixed time step size;

repeating the adjusting the path until a predetermined condition is met, to obtain the optimal path; and navigating the autonomous driving vehicle based on the optimized path.

11. The method of claim 10, wherein the repeating the adjusting the path until the predetermined condition is met comprising:

determining an overall performance metric value representative of the adjusted path by combining performance metric values for performance metrics along the adjusted path comprising a steering angle metric, a kinematic metric, and one or more body locations of the autonomous driving vehicle along the adjusted path; and repeating the adjusting the path until the overall performance metric value is no longer improving or running out of computational time budget.

12. The method of claim 10, further comprising:

adjusting the path received from the path library in response to an actual tractor-trailer vehicle mobility change from a norm affected by a fifth-wheel location setting, a trailer vehicle difference, a maximum feasible steering rate, a trajectory tracking accuracy, a driving maneuver optimality, or a safety purpose.

13. The method of claim 10, wherein the mapped driving area corresponds to a three-dimensional array of grid points overlaid onto a geographic area, comprising location x coordinates, location y coordinates, and heading angle coordinates.

14. The method of claim 13, wherein the geographic area comprises one or more of a parking lot, a narrow street, a cargo hub, or an area where the autonomous driving vehicle will drive in reverse.

15. The method of claim 10, wherein the optimal path from a first location to a second location provides collision avoidance, minimizes steering changes, prevents jackknifing, and is smooth.

16. A non-transitory computer readable medium with executable instructions that when executed by at least one processor perform operations, comprising:

storing a path library in a memory, wherein the path library comprises a plurality of paths for an autonomous vehicle each path starting at one of a plurality of starting locations and ending at one of a plurality of ending locations, wherein the plurality of starting locations and the plurality of ending locations correspond to points on a map, wherein the map comprises a road topology;

generating a first optimal path between a selected starting location and a selected ending location based on a current location and a current heading angle of the autonomous vehicle in the map, wherein one or more autonomous vehicle states affect the first optimal path;

generating a second optimal path based on the first optimal path to avoid fixed obstacles and moving obstacles interfering with the first optimal path sensed by a perception system or one or more autonomous vehicle parameters that are dynamically determined online, wherein the second optimal path is generated by separately solving fixed obstacles in a spatial domain using a fixed distance step size and solving moving obstacles with respect to vehicle speed in a time domain using a fixed time step size; and navigating the autonomous vehicle based on the optimized path.

17. The non-transitory computer readable medium of claim 16 further comprising:

a vehicle controller for generating at least a steering command, a throttle command, and a brake command to cause the autonomous vehicle to follow the second optimal path.

* * * * *